United States Patent
Uddin et al.

(10) Patent No.: US 10,812,963 B2
(45) Date of Patent: Oct. 20, 2020

(54) AUGMENTED ONBOARDING OF INTERNET-OF-THINGS DEVICES

(71) Applicant: Nokia Solutions and Networks Oy, Espoo (FI)

(72) Inventors: Mostafa Uddin, Holmdel, NJ (US); Fang Hao, Morganville, NJ (US); Sarit Mukherjee, Morganville, NJ (US); Huanle Zhang, Davis, CA (US)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 2 days.

(21) Appl. No.: 16/247,797

(22) Filed: Jan. 15, 2019

(65) Prior Publication Data

US 2020/0228958 A1    Jul. 16, 2020

(51) Int. Cl.
| | | |
|---|---|---|
| *H04W 8/00* | (2009.01) | |
| *H04W 4/70* | (2018.01) | |
| *H04M 1/725* | (2006.01) | |
| *H04B 17/27* | (2015.01) | |
| *H04B 17/318* | (2015.01) | |
| *H04W 4/80* | (2018.01) | |

(52) U.S. Cl.
CPC ............ *H04W 8/005* (2013.01); *H04B 17/27* (2015.01); *H04B 17/318* (2015.01); *H04M 1/7253* (2013.01); *H04W 4/70* (2018.02); *H04W 4/80* (2018.02)

(58) Field of Classification Search
CPC ......... H04W 8/005; H04W 4/70; H04W 4/80; H04B 17/27; H04B 17/318; H04M 1/7253
See application file for complete search history.

(56) References Cited

U.S. PATENT DOCUMENTS

| | | | |
|---|---|---|---|
| 2010/0159833 A1* | 6/2010 | Lewis | H04W 4/80 455/41.3 |
| 2011/0053492 A1* | 3/2011 | Hochstein | H05B 47/19 455/7 |
| 2017/0115941 A1* | 4/2017 | Kim | H04M 1/7253 |
| 2020/0042754 A1* | 2/2020 | Trivelpiece | G06Q 10/0833 |

* cited by examiner

*Primary Examiner* — Yuwen Pan
*Assistant Examiner* — Angelica M Perez
(74) *Attorney, Agent, or Firm* — Locke Lord LLP

(57) ABSTRACT

A method, apparatus, and computer program product are disclosed for determining, by a mobile wireless device, a likelihood that a first device ID of a target wireless device corresponds to a physical location of the first wireless device at a first measurement location, based on comparing a measured received signal strength of the target wireless device at the first and a second measurement locations and comparing the measured received signal strength of one or more other wireless devices at the first and second measurement locations. The mobile wireless device registers the first device ID of the target wireless device and associates the registered first device ID with the determined corresponding physical location of the target wireless device.

18 Claims, 10 Drawing Sheets

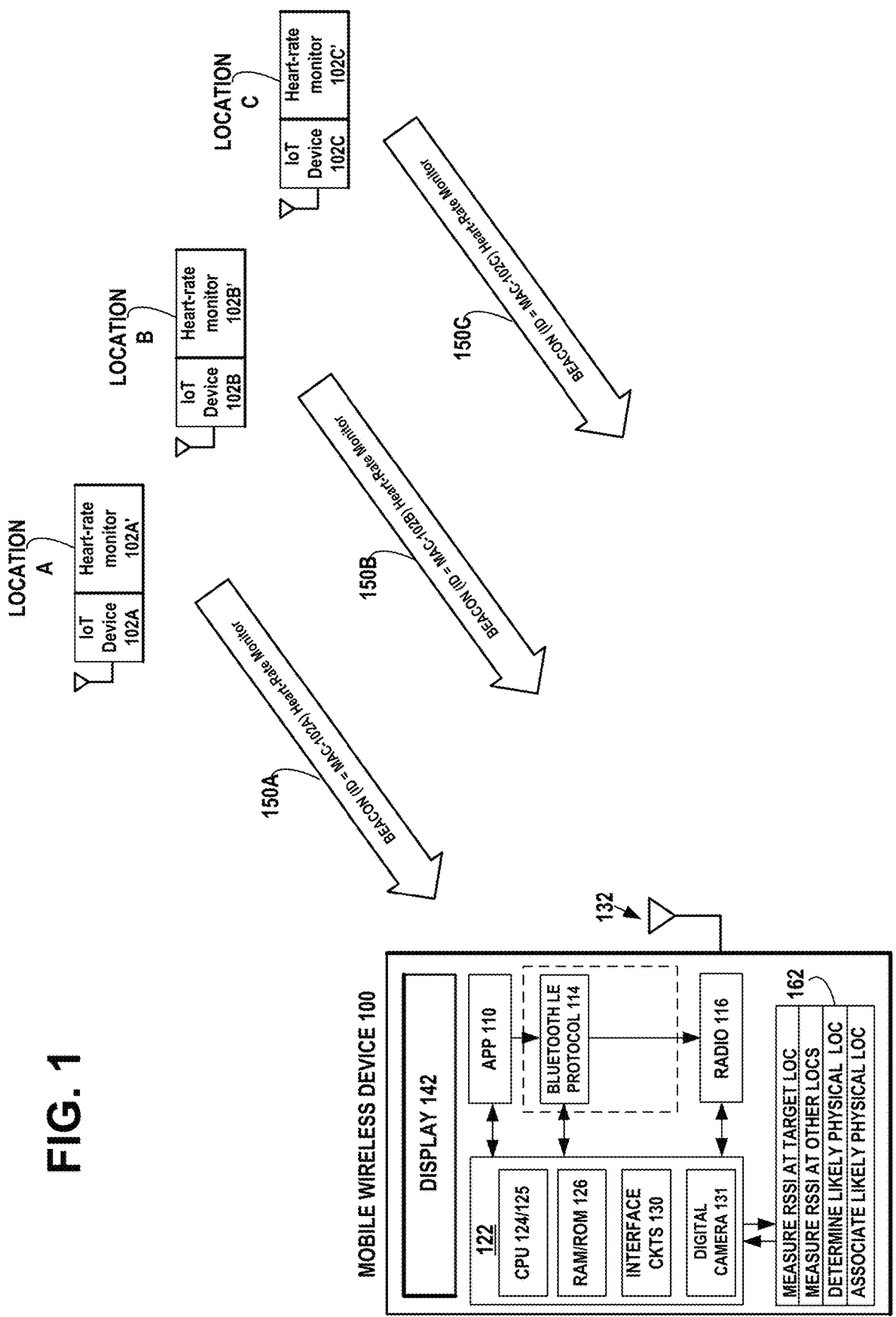

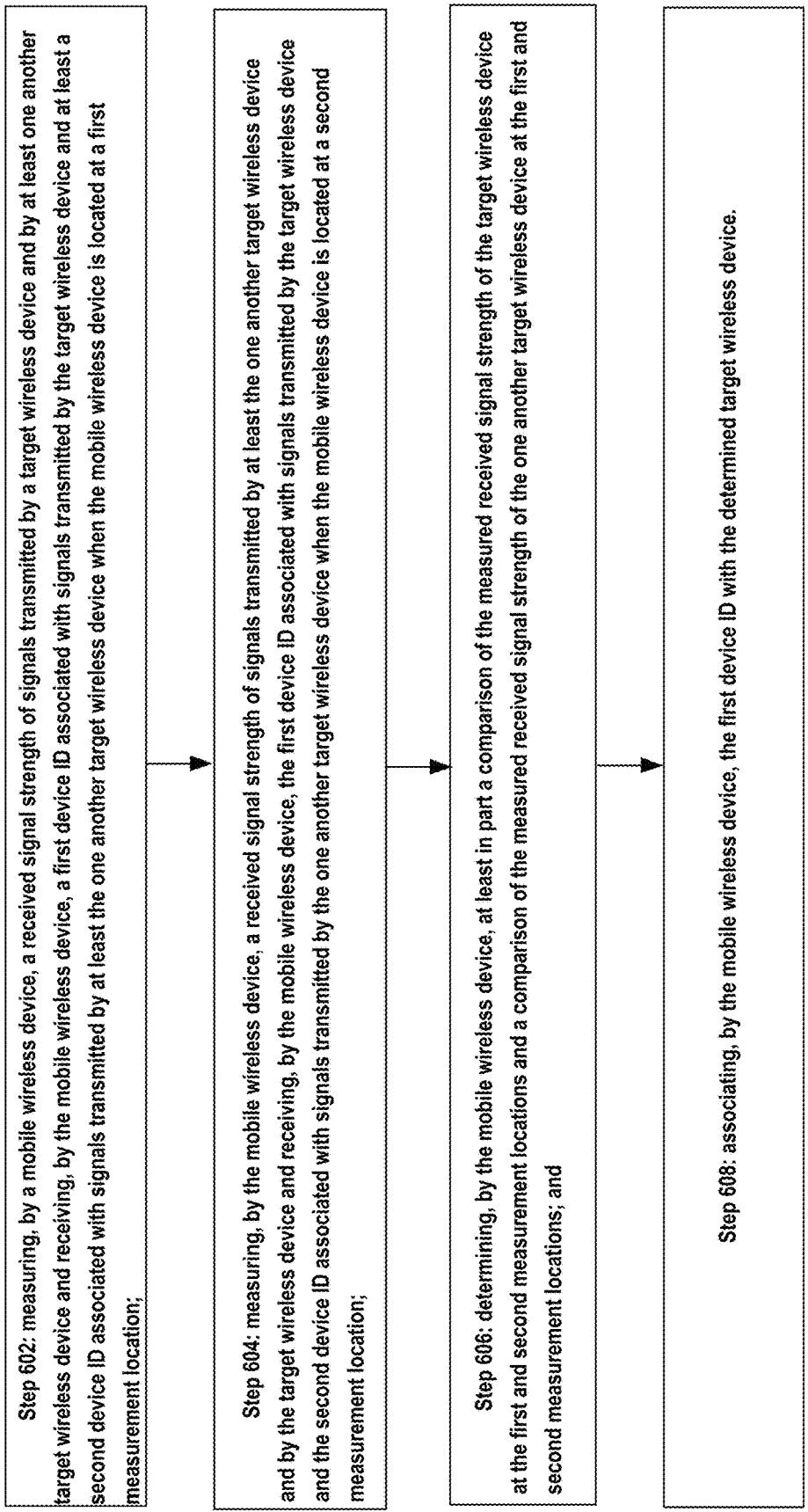

FIG. 6
MOBILE WIRELESS DEVICE 100

Step 602: measuring, by a mobile wireless device, a received signal strength of signals transmitted by a target wireless device and by at least one another target wireless device and receiving, by the mobile wireless device, a first device ID associated with signals transmitted by the target wireless device and at least a second device ID associated with signals transmitted by at least the one another target wireless device when the mobile wireless device is located at a first measurement location;

Step 604: measuring, by the mobile wireless device, a received signal strength of signals transmitted by at least the one another target wireless device and by the target wireless device and receiving, by the mobile wireless device, the first device ID associated with signals transmitted by the target wireless device and the second device ID associated with signals transmitted by the one another target wireless device when the mobile wireless device is located at a second measurement location;

Step 606: determining, by the mobile wireless device, at least in part a comparison of the measured received signal strength of the target wireless device at the first and second measurement locations and a comparison of the measured received signal strength of the one another target wireless device at the first and second measurement locations; and Step 608: associating, by the mobile wireless device, the first device ID with the determined target wireless device.

AUGMENTED ONBOARDING OF INTERNET-OF-THINGS DEVICES

FIELD

The field of the invention relates to registration of wireless devices and correlating the registered identities of the devices with the respective physical devices.

BACKGROUND

The Internet of Things (IoT) continue to expand its reach into homes, industry, hospitals, and other environments, as more and more devices are connected with the purpose of gathering and sharing data. Apart from the convenience aspect, there are several potential benefits of IoT that can lead to increased energy efficiency, improved safety and security, and higher product quality. However, to achieve the benefits of IoT devices, it is to have an efficient on-boarding process that can initialize and provision the devices for accessing the network infrastructure.

In order to on-board IoT devices at large number, we need a streamlined mechanism to register the device to the infrastructure based on its unique digital identity (i.e., MAC or physical address). In addition to seamless enrollment, it is to know, which digital identity corresponds to which physical device. Knowing this information enhances usability [1] and safety [2] in interacting with the surrounding IoT devices. In this invention, we refer such methodology as augmented on-boarding. From now on, we are going refer augmented on-boarding as on-boarding in rest of the description.

IoT devices often use wireless channels (e.g., BLE, Zigbee, Wi-Fi, etc.) for data communication. For those RF-based communication Received Signal Strength (RSS) is considered as the most generic and easily accessible signal strength measurement metric. In that regard, any commercial Off-the-Shelf mobile device that is compatible with IoT wireless communication protocol can be used to measure RSS from receiving beacon or advertising message transmitted from IoT devices. Note that IoT device's digital identity and manufacture name may be carried or can be inferred from the beacon or advertisement message.

RSS is the actual signal strength received at the receiver and is measured in units of dBm, dB, milli Watt, or Watt. A related measure of received signal strength is the received signal strength indicator (RSSI), which is the relative received signal strength in a wireless environment, in arbitrary units. RSSI is an indication of the power level being received by the receiver after the antenna and possible cable loss.

Often the process to on-board IoT devices is time consuming and labor intensive, which becomes the barrier to streamlined IoT adoption and deployment [2]. Furthermore, the complexity of deploying large number of devices may also increase the vulnerability and security risk of the infrastructure.

To better understand the limitation of the current manual on-boarding process, imagine that an enterprise has acquired many smart light bulbs and installed them on ceiling, wall or floor. These devices can be controlled through wired or wireless communication such as BLE, WiFi and Zigbee. But before the system administrator or operator can operate these light bulbs, s(he) needs to know the device ID (MAC address or physical address) of the light bulb. Note that although the human-readable manufacturer names may be contained in the beacon packet, these names can help to separate different types of devices (e.g. light bulbs vs. thermostats), or devices from different manufacturers. It is difficult to know (physically) which light bulb has which device ID just based at least partly on beacon packets for example where all light bulbs are from the same manufacturer. To on-board these light bulbs manually, the operator may either try to find the MAC address on the original package of the device and enter them into the system one by one, or they can try to connect to each light bulb one at a time, and turn it on/off and try to verify which device is under control. We can see that such manual on-boarding process is very tedious and error-prone, and can be very inefficient when the number of devices is large. In addition, for devices that do not give visual feedback about its operational status, e.g., sensors that do not show on/off status, it can be difficult to verify their device IDs without testing each of them in isolation.

What is needed is a way to differentiate devices based on their signal characteristics.

SUMMARY

In accordance with an example embodiment of the invention, a mobile wireless device determines a likelihood that a first device ID of a target wireless device corresponds to a physical location of the first wireless device at a first measurement location, based on comparing a measured received signal strength of the target wireless device at the first and a second measurement locations and comparing the measured received signal strength of one or more other wireless devices at the first and second measurement locations. The mobile wireless device registers the first device ID of the target wireless device and associates the registered first device ID with the determined corresponding physical location of the target wireless device.

An example embodiment of the invention comprises:

measuring, by a mobile wireless device, a received signal strength of signals transmitted by a target wireless device and by at least one another target wireless device and receiving, by the mobile wireless device, a first device ID associated with signals transmitted by the target wireless device and at least a second device ID associated with signals transmitted by at least the one another target wireless device when the mobile wireless device is located at a first measurement location;

measuring, by the mobile wireless device, a received signal strength of signals transmitted by at least the one another target wireless device and by the target wireless device and receiving, by the mobile wireless device, the first device ID associated with signals transmitted by the target wireless device and the second device ID associated with signals transmitted by the one another target wireless device when the mobile wireless device is located at a second measurement location;

determining, by the mobile wireless device, at least in part a comparison of the measured received signal strength of the target wireless device at the first and second measurement locations and a comparison of the measured received signal strength of the one another target wireless device at the first and second measurement locations; and associating, by the mobile wireless device, the first device ID with the determined target wireless device.

The example embodiment of the invention further comprises:

displaying, by the mobile wireless device, on a user interface, a first object image of the target wireless device and a second object image of at least the one another target wireless device;

receiving, by the mobile wireless device, via the user interface, a user selection of the first object image when the mobile wireless device is located at the first measurement location near the target wireless device, and receiving, by the mobile wireless device, via the user interface, a user selection of the second object image when the mobile wireless device is located at the second measurement location near at least the one another target wireless device;

binding, by the mobile wireless device, the first object image with the first device ID associated with the signals transmitted by the target wireless device, in response to the determined likelihood that the first device ID of the target wireless device corresponds to a physical location of the first wireless device at the first measurement location.

The example embodiment of the invention further comprises:

capturing, by the mobile wireless device, with a digital camera associated with the mobile wireless device, the first object image of the target wireless device and the second object image of at least the one another target wireless devices.

The example embodiment of the invention further comprises:

moving, by the mobile wireless device, over a generally circular path when the mobile wireless device is located at the first measurement location near the target wireless device, and making a plurality of measurements of the received signal strength of the target wireless device while the mobile wireless device is at the first measurement location, to obtain an average value of the measured received signal strength to mitigate possible multi-path effects in the measurement.

The example embodiment of the invention further comprises:

processing, by the mobile wireless device, a voting-based algorithm to determine the likelihood that the first device ID of the target wireless device corresponds to the physical location of the first wireless device at the first measurement location;

wherein, the mobile wireless device device determines that an ith target wireless device and at least the one another target wireless device receive a vote for measurement location j, reflecting likelihood of being at measurement location j and the vote is calculated as $\Sigma_{k=1}^{N}(d_{ij}-d_{ik})$ derived by comparing the ith target wireless device's received signal strength $d_{ij}$ at location j with other measurement locations; and wherein, the mobile wireless device device determines that a higher vote for the ith target wireless device at measurement location j means that the ith target wireless device has greater received signal strength $d_{ij}$ at measurement location j compared to that at other measurement locations.

The example embodiment of the invention further comprises:

wherein, the vote is jointly determined by measurement results from all locations using an M-by-N vote matrix V:

$$V = \begin{bmatrix} \sum_{j=1}^{N}(d_{11}-d_{1j}) & \cdots & \sum_{j=1}^{N}(d_{1N}-d_{1j}) \\ \sum_{j=1}^{N}(d_{21}-d_{2j}) & \cdots & \sum_{j=1}^{N}(d_{2N}-d_{2j}) \\ \cdots & \cdots & \cdots \\ \sum_{j=1}^{N}(d_{M1}-d_{Mj}) & \cdots & \sum_{j=1}^{N}(d_{MN}-d_{Mj}) \end{bmatrix} \quad (2)$$

searching, by the mobile wireless device, the vote matrix V for a largest vote summation of N elements in V;

wherein, the N elements are from unique devices in different rows of the vote matrix V and unique measurement locations in different columns of the vote matrix V.

Various further embodiments of the invention may comprise at least one feature drawn from the following bulleted list:

Received signal strength indicator (RSSI) may not always be reliable due to multi-path effects. However, the example embodiments of the invention mitigate such effects. In example embodiments of the invention, instead of using the absolute RSSI value, instead, the relative change in RSSI is used at different locations, to formulate a voting matrix, which provides scores for the target device at different locations.

In example embodiments of the invention, an algorithm may be used that maps the device ID (extracted from the beacon message) with the corresponding device (identified by its measurement location).

In example embodiments of the invention, during interaction between the user and the mobile wireless device, the user knows to go to the next location from the already measured location.

In example embodiments of the invention, the measured RSSI data have enough variability within one of the generally circular movement and an average value over the generally circular movement remains stable within a predefined threshold, indicating that the mobile device can stop measuring.

In example embodiments of the invention, a 3D scenario may be used to measure the target device from a location as close to the device as possible. In the 3D scenario, first identify objects that are directly reachable, for example, those on floor and wall, because in this case example embodiments of the invention result in 100 percent accuracy. After separating out those devices that are easier to identify, then measure the devices that are not directly approachable, e.g., those on ceiling.

In example embodiments of the invention, a user interface (UI) screen shows a still image that has one or more of the target devices and their positions. The user clicks on the target device and performs the corresponding measurement. After the measurement has been done for all target devices, an algorithm is invoked to produce a mapping.

In example embodiments of the invention, a still image that contains all the target devices is may be taken before the measurement. Image processing is used to recognize and locate the devices in the image. During the measurement, when the operator gets physically close to a target device, she can visually identify the corresponding device in the image, and then click on the device in the image and collect the measurement.

This may also be done automatically with a smartphone camera and advanced machine learning based a computer vision technique, to detect and track the objects during the measurement.

In example embodiments of the invention, the measurement location of the mobile wireless device is made closest to the target device, when compared to other target devices, in order to increase the accuracy.

In example embodiments of the invention, keeping the distance between the target device and the measurement location of the mobile wireless device substantially approximately in same distance, a generally circular movement of the mobile wireless device may be made around that measurement location (which is for example couple of inches away from the measurement location). The purpose of the generally circular motion is to add some small perturbation to the measurement location in order to reduce multi-path effects. In the inventors' experiment, the rate of the generally circular movement was 1-2/sec per circle, however, rates of motion may be used. Circling multiple times may improve the accuracy of the results.

In example embodiments of the invention, the mobile wireless device may send the signal data to a server to make the calculations.

DESCRIPTION OF THE FIGURES

FIG. 1 is an illustration of an example embodiment of the invention in a hospital emergency room scenario, illustrating a mobile wireless device 100 receiving beacon signals from Bluetooth Low Energy (BLE) heart-rate monitoring devices 102A', 102B', and 102C', each including a respective IoT wireless device 102A, 102B, and 102C that transmits a respective beacon signal 150A, 150B, and 150C that includes a respective device ID, such as a MAC.

FIG. 2B plots measurements of RSS without local movements. FIG. 2C plots measurements of RSS with local movements.

FIGS. 5A and 5B are bar charts illustrating the accuracy of onboarding two target wireless devices on the ceiling, wherein FIG. 5A is for devices two feet apart and FIG. 5B is for devices four feet apart.

FIG. 6 illustrates an example flow diagram of operational steps in the mobile wireless device, in accordance with an example embodiment of the invention.

DISCUSSION OF EXAMPLE EMBODIMENTS OF THE INVENTION

Figure 1A:
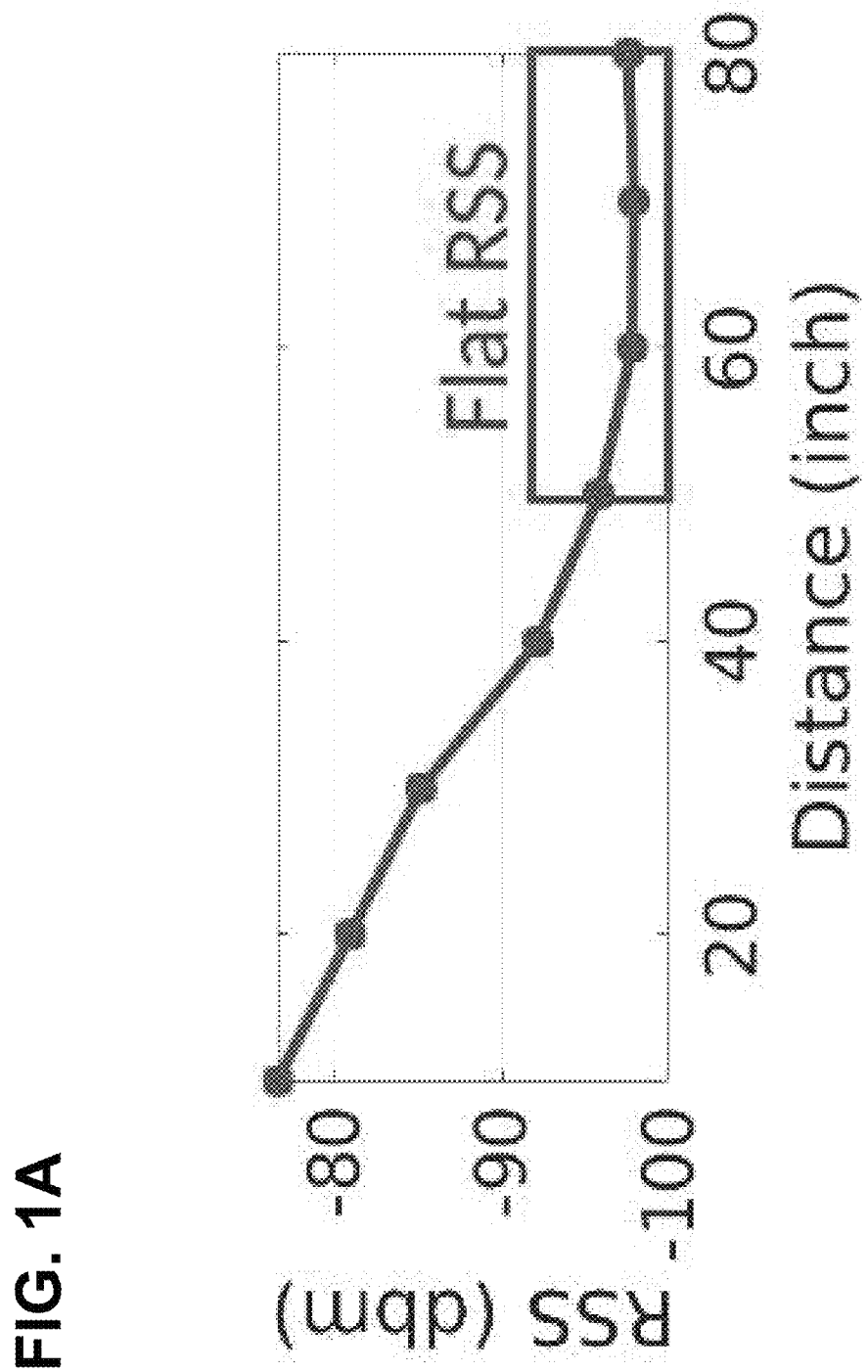
FIG. 1A is a graph of measured received signal strength (RSS) vs distance between a wireless beacon device and a mobile wireless device, illustrating that a flat RSS value occurs beyond a certain distance.

In general, the intended usage of example embodiments of the invention is to aid the onboarding process of a newly deployed Internet of Things (IoT) device so that this device can be registered into a centralized control system. For example, when an enterprise acquires a set of new smart light bulbs or sensors, the system administrator or operator first needs to onboard these devices into the system. Furthermore, they need to map the device ID (e.g. MAC address) to each physical device. The proposed example embodiments of the invention intend to provide a more streamlined process for this step. The usage of example embodiments of the invention is to help the owner of the system to automate the process of mapping physical devices to their IDs either when such devices are installed for the first time, or when they are re-deployed in a different infrastructure; the intention is not to let random users gain access to the devices.

In addition, the proposed example embodiments of the invention regarding measurement and algorithms do not intend to find the location of the IoT devices. Instead, the interest is in knowing how the device is located relative to each other (e.g., left, right, up, down). Based on their relative locations, example embodiments of the invention differentiate multiple IoT devices. Localization is a well-studied problem, and the literature has shown RSS based localization cannot achieve high accuracy. However, by relying on relative locations, the example embodiments of the invention can achieve high accuracy for the purpose of mapping device IDs to device locations.

The following use-case scenario of Inventory Management in Hospitals will illustrate some of the advantages of example embodiments of the invention.

Example embodiments of the invention may be used in managing day-to-day inventory in the medical sector. Consider a scenario where a patient is admitted to a hospital emergency care. In this environment, for efficient utilization of space and easy movement of the physicians, often patients are assigned to hospital beds that are close to each other, separated by curtains (i.e., vertical treatment room). Once a patient is admitted, (s)he wears a wrist band with bar-code that represents the identity of that patient. This identity is used by the hospital to maintain the record about the patient. Now, assume that the hospital has an inventory of Bluetooth Low Energy (BLE) heart-rate monitoring devices, including a wireless device that transmits a beacon signal that includes a device ID, such as a MAC. Since heart-rate monitoring devices are typically acquired in batches, many of them are from the same manufacturing companies and have the same model numbers. One of the heart-rate monitors will be attached to the patient after (s)he is admitted. The de facto process requires registering all devices in the inventory by entering their MAC addresses and serial numbers etc. into the database, and to also attach a printed label with its unique ID to this device. Then when the device is assigned to the patient, again associate the device label with the patient's record. In this way, the hospital can monitor the patient status and at the same time keep record of their inventory. If the registering and associating steps were to be done manually, such a manual process may be error-prone and inefficient. However, in accordance with example embodiments of the invention, the physician or nurse, may simply hold a mobile wireless device close to the heart-rate monitor.

In response, the mobile wireless device determines a likelihood that the device ID or MAC of beacons received from the target wireless device of the heart-rate monitor, corresponds to a physical location of the heart-rate monitor at a first measurement location. This is based on comparing a measured received signal strength of the target wireless device at the first and a second measurement locations and comparing the measured received signal strength of one or more other wireless devices included in one or more other heart-rate monitors at the first and second measurement locations. The mobile wireless device registers the device ID of the target wireless device and associates the registered device ID with the determined corresponding physical location of the heart-rate monitor. The mobile device will automatically identify the physical location of the heart-rate monitor based on the beacon signal of its target wireless device, despite having other beacon signals from other similar heart-rate monitoring devices of nearby patients. Later, the physical location of the heart-rate monitor may be associated with the patent's record.

FIG. 1 is an illustration of an example embodiment of the invention in a hospital emergency room scenario, illustrating a mobile wireless device 100 receiving beacon signals from Bluetooth Low Energy (BLE) heart-rate monitoring devices 102A', 102B', and 102C', each including a respective IoT wireless device 102A, 102B, and 102C that transmits a respective beacon signal 150A, 150B, and 150C that includes a respective device ID, such as a MAC.

The mobile wireless device 100 is shown scanning for Bluetooth™ Low Energy protocol (BLE) advertising messages or beacons 150. The IoT wireless device 102A, IoT wireless device 102B, and IoT wireless device 102C are shown broadcasting BLE advertising messages or beacons 150 over any of the 3 advertising PHY channels used by nodes to advertise their existence and capabilities. The BLE advertising messages or beacons 150 include the MAC ID and possible other data, such as battery status and buffer information of the IoT wireless device 102A, IoT wireless device 102B, and IoT wireless device 102C. The mobile wireless device 100 is shown receiving the advertising messages or beacons 150A, 150B, and 150C that includes a respective device ID, such as a MAC.

When the mobile wireless device 100 is located at the first measurement location A, the mobile wireless device 100 measures a received signal strength of advertising messages or beacons 150A transmitted by a target wireless device 102A when the mobile wireless device 100 is located at a first measurement location A near the target wireless device 102A. The mobile wireless device 100 receives a first device ID=MAC 102A associated with the advertising messages or beacons 150A transmitted by the target wireless device 102A when the mobile wireless device 100 is located at the first measurement location A.

While the mobile wireless device 100 is located at the first measurement location A, the mobile wireless device 100 measures a received signal strength of advertising messages or beacons 150B transmitted by a second wireless device 102B when the mobile wireless device 100 is located at the first measurement location A near the target wireless device 102A. The mobile wireless device 100 receives a second device ID=MAC 102B associated with the advertising messages or beacons 150B transmitted by the second wireless device 102B when the mobile wireless device 100 is located at the first measurement location A.

While the mobile wireless device 100 is located at the first measurement location A, the 'mobile wireless device 100 measures a received signal strength of advertising messages or beacons 150C transmitted by a third wireless device 102C when the mobile wireless device 100 is located at the first measurement location A near the target wireless device 102A. The mobile wireless device 100 receives a third device ID=MAC 102C associated with the advertising messages or beacons 150C transmitted by the third wireless device 102C when the mobile wireless device 100 is located at the first measurement location A.

When the mobile wireless device 100 moves on and is located at the second measurement location B, the mobile wireless device 100 measures a received signal strength of advertising messages or beacons 150A transmitted by the target wireless device 102A when the mobile wireless device 100 is located at the second measurement location B near the second wireless device 102B. The mobile wireless device 100 receives the first device ID=MAC 102A associated with the advertising messages or beacons 150A transmitted by the target wireless device 102A when the mobile wireless device 100 is located at the second measurement location B.

While the mobile wireless device 100 is located at the second measurement location B, the mobile wireless device 100 measures a received signal strength of advertising messages or beacons 150B transmitted by the second wireless device 102B when the mobile wireless device 100 is located at the second measurement location B near the second wireless device 102B. The mobile wireless device 100 receives the second device ID=MAC 102B associated with the advertising messages or beacons 150B transmitted by the second wireless device 102B when the mobile wireless device 100 is located at the second measurement location B.

While the mobile wireless device 100 is located at the second measurement location B, the mobile wireless device 100 measures a received signal strength of advertising messages or beacons 150C transmitted by the third wireless device 102C when the mobile wireless device 100 is located at the second measurement location B near the second wireless device 102B. The mobile wireless device 100 receives the third device ID=MAC 102C associated with the advertising messages or beacons 150C transmitted by the third wireless device 102C when the mobile wireless device 100 is located at the second measurement location B.

When the mobile wireless device 100 moves on and is located at the third measurement location C, the mobile wireless device 100 measures a received signal strength of advertising messages or beacons 150A transmitted by the target wireless device 102A when the mobile wireless device 100 is located at the third measurement location C near the third wireless device 102C. The mobile wireless device 100 receives the first device ID=MAC 102A associated with the advertising messages or beacons 150A transmitted by the target wireless device 102A when the mobile wireless device 100 is located at the third measurement location C.

While the mobile wireless device 100 is located at the third measurement location C, the mobile wireless device 100 measures a received signal strength of advertising messages or beacons 150B transmitted by the second wireless device 102B when the mobile wireless device 100 is located at the third measurement location C near the third wireless device 102C. The mobile wireless device 100 receives the second device ID=MAC 102B associated with the advertising messages or beacons 150B transmitted by the second wireless device 102B when the mobile wireless device 100 is located at the third measurement location C.

While the mobile wireless device 100 is located at the third measurement location C, the mobile wireless device 100 measures a received signal strength of advertising messages or beacons 150C transmitted by the third wireless device 102C when the mobile wireless device 100 is located at the third measurement location C near the third wireless device 102C. The mobile wireless device 100 receives the third device ID=MAC 102C associated with the advertising messages or beacons 150C transmitted by the third wireless device 102C when the mobile wireless device 100 is located at the third measurement location C.

The mobile wireless device 100 determines a likelihood that the first device ID=MAC 102A of the target wireless device 102A corresponds to the physical location of the first wireless device 102A at the first measurement location A, based on comparing the measured received signal strength of the target wireless device 102A at the first, second, and third respective measurement locations A, B, and C, comparing the measured received signal strength of the second wireless device 102B at the first, second, and third respective measurement locations A, B, and C, and comparing the measured received signal strength of the third wireless device 102C at the first, second, and third respective measurement locations A, B, and C.

The mobile wireless device 100 registers the first device ID=MAC 102A of the target wireless device 102A and associates the registered first device ID=MAC 102A with the determined corresponding physical location A of the target wireless device 102A.

In an example embodiment of the invention, using a digital camera 131 associated with the mobile wireless device 100, the user may capture the whole image of the surrounding devices or the group of devices that are to be mapped. The mobile wireless device 100 may include a smartphone application that will recognize those devices in the image, providing a complete layout of the devices in a single image. Later during the measurement, the user may manually select devices from that image layout. In this way, the smartphone application will know which physical device the user is close to during the measurement. If the devices cannot fit in one image, then multiple images may be taken and the user may choose the right one during measurement. In another embodiment of the invention, the mobile wireless device 100 may use depth sensing in the camera 131 to recognize and track which physical device the user is close to during the measurement.

The mobile wireless device 100 displays on a user interface display 142 a first object image of the target wireless device and a second object image of the one or more other wireless devices. The mobile wireless device 100 receives via the user interface, a user selection of the first object image when the mobile wireless device is located at the first measurement location near the target wireless device, and receiving, by the mobile wireless device, via the user interface, a user selection of the second object image when the mobile wireless device is located at the second measurement location near the one or more other wireless devices. The mobile wireless device 100 binds the first object image with the first device ID associated with the signals transmitted by the target wireless device, in response to the determined likelihood that the first device ID of the target wireless device corresponds to a physical location of the first wireless device at the first measurement location.

In an example embodiment of the invention, the mobile wireless device includes an algorithm that maps the device ID extracted from the signals transmitted by the target wireless device and by the at least one another target wireless device, with a corresponding device identified by its measured location.

In an example embodiment of the invention, a user interface (UI) screen shows a still image that has one or more of the target wireless device and the at least one another target wireless device and their positions, enabling the user to click on the target device and perform a corresponding measurement, and after the measurement has been made for the clicked target devices, an algorithm in the mobile wireless device maps each device ID extracted from the signals transmitted by the target wireless device and by the at least one another target wireless device.

In an example embodiment of the invention, during interaction between the user and the mobile wireless device, the user knows to go to the next location from the already measured location.

In an example embodiment of the invention, the mobile wireless device 100 captures with a digital camera 131 associated with the mobile wireless device, the first object image of the target wireless device and the second object image of the one or more other wireless devices.

In an example embodiment of the invention, a digital camera associated with the mobile wireless device, captures a still image taken before the measurement, containing images of the target wireless device and the at least one another target wireless device, and an image processing algorithm recognizes and locates the devices in the still image, enabling the user, during the measurement, when physically close to a target device, to visually identify the corresponding device in the still image, then click on the device in the still image, and collect the measurement.

In an example embodiment of the invention, the mobile wireless device 100 is moved by the user moves over a generally circular path when the mobile wireless device is located at the first measurement location near the target wireless device. In an example embodiment of the invention, the mobile wireless device 100 makes a plurality of measurements of the received signal strength of the target wireless device while the mobile wireless device is at the first measurement location, to obtain an average value of the measured received signal strength to mitigate possible multi-path effects in the measurement.

In an example embodiment of the invention, measured received signal strength indicator (RSSI) data have enough variability within one generally circular movement path of the mobile wireless device, so that an average value of the measured RSSI over the generally circular movement path remains stable within a predefined threshold, indicating that the mobile wireless device can stop measuring.

In an example embodiment of the invention, a generally circular movement of the mobile wireless device is made one or more times around a measurement location to add a small perturbation to the measurement in order to reduce multi-path effects.

In an example embodiment of the invention, the mobile wireless device 100 processes a voting-based algorithm to determine the likelihood that the first device ID of the target wireless device corresponds to the physical location of the first wireless device at the first measurement location. Each device i of the target device and the one or more other devices receives a vote for location j, reflecting its likelihood of being at location j and the vote is calculated as $\Sigma_{k=1}^{N}(d_{ij}-d_{ik})$ derived by comparing device i's received signal strength $d_{ij}$ at location j with other locations. A higher vote for device i at location j means that device i has greater received signal strength $d_{ij}$ at location j compared to that at other locations. Each device i of the target device and the one or more other devices compares its own signal strength at different locations, so that the vote is not affected by a difference of transmission powers between devices.

In an example embodiment of the invention, the vote is jointly determined by measurement results from all locations using an M-by-N vote matrix V:

$$V = \begin{bmatrix} \sum_{j=1}^{N}(d_{11}-d_{1j}) & \cdots & \sum_{j=1}^{N}(d_{1N}-d_{1j}) \\ \sum_{j=1}^{N}(d_{21}-d_{2j}) & \cdots & \sum_{j=1}^{N}(d_{2N}-d_{2j}) \\ \cdots & \cdots & \cdots \\ \sum_{j=1}^{N}(d_{M1}-d_{Mj}) & \cdots & \sum_{j=1}^{N}(d_{MN}-d_{Mj}) \end{bmatrix} \quad (2)$$

In an example embodiment of the invention, the mobile wireless device 100 searches the vote matrix V for a largest vote summation of N elements in V. The N elements are from unique devices in different rows of the vote matrix V and unique measurement locations in different columns of the vote matrix V.

In example embodiments of the invention, the mobile wireless device 100, the IoT wireless device 102A, IoT wireless device 102B, and IoT wireless device 102C may include a processor 122 that includes from one to many central processing units (CPUs) 124 and/or 125, a random access memory (RAM)/a read only memory (ROM) 126, and interface circuits 130 to interface with one or more radio transceivers 116, antenna 132, and battery or house power sources. The mobile wireless device 100 may include a keypad, display 142, etc. The RAM and ROM may be removable memory devices such as smart cards, SIMs, WIMs, semiconductor memories such as RAM, ROM, PROMS, flash memory devices, etc. In an example embodiment of the invention, the RAM 126 or buffer 162 in the mobile wireless device 100 may store the default service information contained in received advertising messages 150, for example, a description of the capabilities of the sending wireless devices 102 in received advertising messages or beacons 150.

In an example embodiment of the invention, the Bluetooth mobile wireless device 100, IoT wireless device 102A, IoT wireless device 102B, and IoT wireless device 102C include the Bluetooth™ Low Energy protocol (BLE) 114.

The CPU 124/125 may comprise, for example, a single- or multi-core processor wherein a single-core processor comprises one processing core and a multi-core processor comprises more than one processing core. CPU 124/125 may comprise, in general, a control device. CPU 124/125 may comprise more than one processor. CPU 124/125 may be a control device. A processing core may comprise, for example, a Cortex-A8 processing core manufactured by ARM Holdings or a Steamroller processing core produced by Advanced Micro Devices Corporation. CPU 124/125 may comprise at least one Qualcomm Snapdragon and/or Intel Atom processor. CPU 124/125 may comprise at least one application-specific integrated circuit, ASIC. CPU 124/125 may comprise at least one field-programmable gate array, FPGA. CPU 124/125 may be means for performing method steps in the mobile wireless device 100. CPU 124/125 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The mobile wireless device 100 may comprise memory 126. Memory 106 may comprise random-access memory and/or permanent memory. Memory 106 may comprise at least one RAM chip. Memory 106 may comprise solid-state, magnetic, optical and/or holographic memory, for example. Memory 106 may be at least in part accessible to CPU 124/125. Memory 106 may be at least in part comprised in CPU 124/125. Memory 106 may be means for storing information. Memory 106 may comprise computer instructions that CPU 124/125 is configured to execute. When computer instructions configured to cause CPU 124/125 to perform certain actions are stored in memory 106, and the mobile wireless device 100 overall is configured to run under the direction of CPU 124/125 using computer instructions from memory 106, CPU 124/125 and/or its at least one processing core may be considered to be configured to perform said certain actions. Memory 106 may be at least in part comprised in CPU 124/125. Memory 106 may be at least in part external to the mobile wireless device 100 but accessible to device 100.

Mobile wireless device 100 may comprise a transmitter and receiver 116. Transmitter and receiver 116 may be configured to transmit and receive, respectively, information in accordance with at least one cellular or non-cellular standard. Transmitter and receiver 116 may comprise more than one transmitter and more than one receiver.

In an example embodiment of the invention, the mobile wireless device 100 may be, for example, a miniature device such as a key fob, smart card, jewelry, or the like. In an example embodiment of the invention, the mobile wireless device 100 may be, for example, a relatively larger cell phone, smart phone, flip-phone, PDA, graphic pad. The mobile wireless device 100 and/or IoT wireless device 102A, IoT wireless device 102B, and IoT wireless device 102C may also be in an automobile or other vehicle. In embodiments, the relative sizes of mobile wireless device 100, IoT wireless device 102A, IoT wireless device 102B, and IoT wireless device 102C may be arbitrary.

In accordance with example embodiments of the invention, an operating principle is to differentiate the IoT wireless device 102A, IoT wireless device 102B, and IoT wireless device 102C based on their Received Signal Strength (RSS) values. In a deployed environment, these devices are typically separated from each other by a certain distance. For example, light bulbs equipped with IoT beacons, may be installed on the ceiling with several feet in between them. Similarly, hand held devices equipped with IoT beacons, may be separated from each other by moving them apart. In accordance with example embodiments of the invention, when measurements are made of the RSS values of different devices, generally some difference should be detected in their signal strength due to their location differences. Note that RSS is available in almost all customer-off-the-shelf (COTS) wireless receivers, regardless of what wireless communication is used, e.g., WiFi, BLE and Zigbee, which makes the RSS-based solution of example embodiments of the invention, IoT-protocol independent.

One naive solution to identify a target wireless device may be to measure the RSS values by holding a mobile wireless device closest to this target wireless device and then identify this device as the one with the highest RSS value. However, there are a number of challenges that make such naive solution not work well. First, the RSS value drops exponentially with the increase in distance, which makes it difficult to reliably compare two signals beyond a certain distance range. Therefore, in order to create a reliable RSS contrast, measurements should be conducted at a close proximity to the target device. However, in many cases, due to physical constraint (e.g., devices on the ceiling) or an obstruction (e.g., furniture in the way), target wireless devices may not be approachable. Furthermore, RSS measurements may be affected significantly by the multi-path effect. A slight change in the location or direction may cause significant changes in measurement results. To further complicate the matter, RSS values may vary significantly across the wireless beacon devices. Even for the same type of wireless beacon devices, their RSS values vary due to other factors, such as battery levels or age.

Due to the above-described signal and physical constraints, experiments show that the naive approach of selecting a maximum RSS measurement to identify wireless beacon devices provides about a 65% accuracy. In accordance with an example embodiment of the invention, a more carefully designed measurement approach systematically samples across multiple locations, and then uses a voting-based algorithm to process the RSS measurement results for different devices at different locations, to infer the wireless beacon device identities. Preliminary experiments in several different indoor environments, demonstrate that example embodiments of the invention may significantly improve the measurement accuracy over the naive approach. In the case that the target wireless device is directly reachable, example embodiments of the invention may achieve 100% accuracy.

In the case that the target devices are installed on the ceiling and are not directly reachable, example embodiments of the invention may achieve about 90% accuracy.

FIG. 1A is a graph of measured received signal strength (RSS) vs distance between a wireless beacon device and a mobile wireless device, illustrating that a flat RSS value occurs beyond a certain distance. In accordance with example embodiments of the invention, RSS is passively measured for al wireless beacon signals from surrounding wireless devices. RSS may be considered as a generic and easily accessible measurement metric in wireless signal environments. Any COTS mobile wireless device that is compatible with IoT wireless communication protocol may be used as a receiver in accordance with example embodiments of the invention. Thus, without any modification of software and hardware in existing deployed IoT wireless beacon devices, and without any infrastructure support, such as access points, example embodiments of the invention may use any mobile wireless device to measure ambient beacon signals.

Figure 1B:
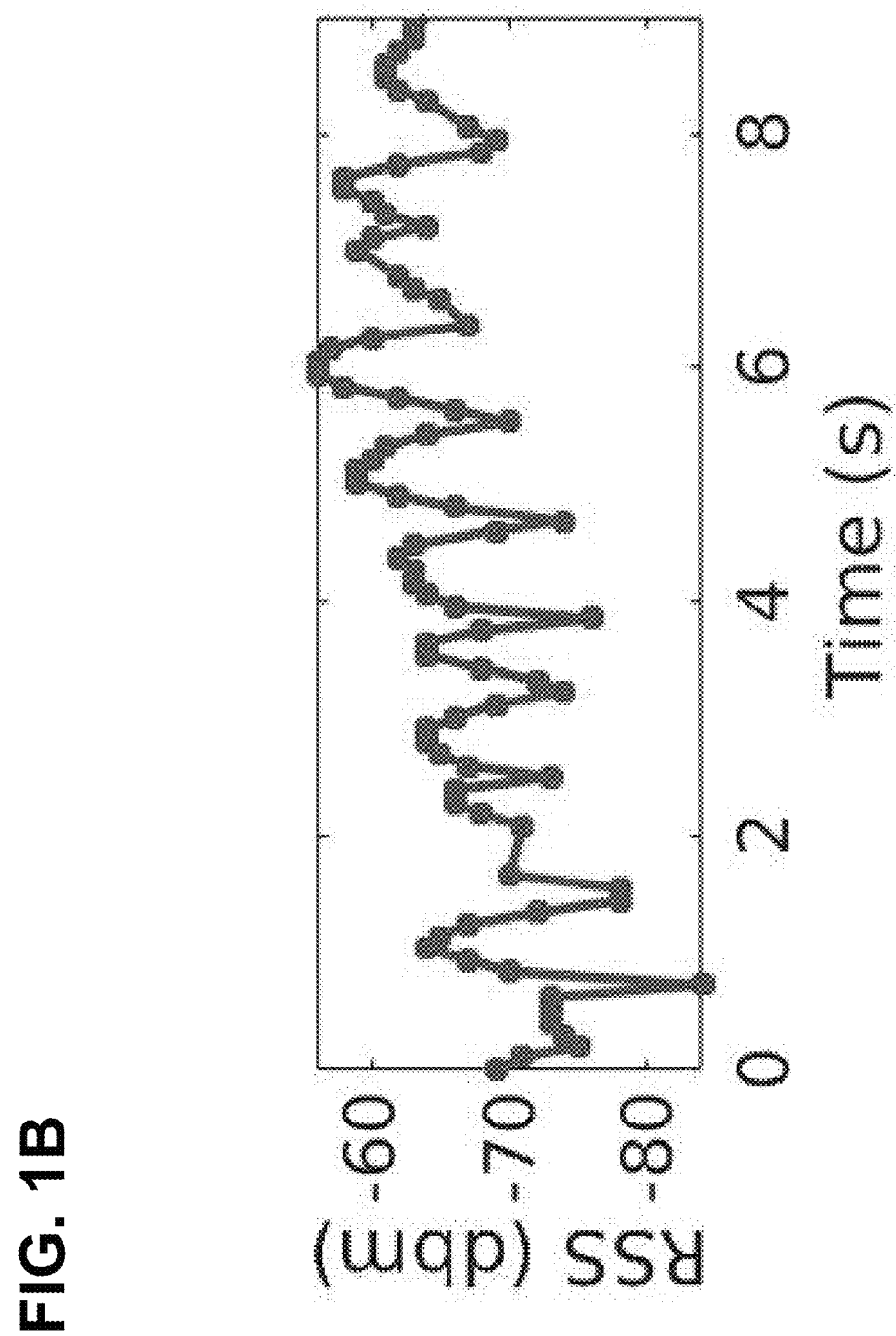
FIG. 1B is a graph of received signal strength (RSS) vs time, between a wireless beacon device and a moving mobile wireless device, illustrating that the RSS measurement may vary due to variations in transmission power, variations in distance, variations in the multi-path effect, etc.

Despite the ease of RSS measurement, there are a number of challenges due to the characteristics of signals, and the physical settings in an indoor environment. FIG. 1B is a graph of received signal strength (RSS) vs time, between a wireless beacon device and a moving mobile wireless device, illustrating that the RSS measurement may vary due to variations in transmission power, variations in distance, variations in the multi-path effect, etc.

In the following list, describes different causes for varying RSS measurements.

Different devices have different transmission powers. Assume, two devices of the same type (device 'A' and 'B') side-by-side, and their transmission powers differ because one has (device 'A') higher battery capacity than the other (device 'B'). Note that, an increase of transmission power increases the RSS value of the received signal. Given the close proximity of device 'A' and 'B', even if measurements are made of RSS from both devices at the position of device 'B', a higher absolute RSS value will be seen for device 'A' compared to device 'B'. Thus, the absolute RSS value may not be relied on to infer the proximity of devices.

Beyond a certain distance, changes in RSS are indistinguishable. FIG. 1A shows a trace in which the RSS does not decrease much beyond 50 inches. Therefore, measuring RSS in close proximity helps in distinguishing target devices. However, it may not always be possible to get close to the target devices or devices may not be approachable. For example, if devices are deployed on the ceiling, the mobile wireless device cannot get very close to the target devices. In these circumstances, it is challenging to use RSS to distinguish target devices from a distances away, especially when several target devices clustered close together. From a distance, at a particular location, it is more difficult to obtain contrasting RSS measurements to distinguish target devices.

RSS data in an indoor environment may be noisy because of the multi-path effect. FIG. 1B shows a trace of measured RSS when the mobile wireless device is held by the user while walking directly toward a wireless beacon transmitter located 80 inches away. Although the measured RSS is seen to increase as a general trend, the data fluctuates significantly. Due to the multi-path effect, measuring at a larger distance may show a higher RSS value compared to a shorter distance from the target device. Therefore, without proper techniques to combat the multi-path effect, the accuracy of RSS measurements may degrade.

Figure 2A:
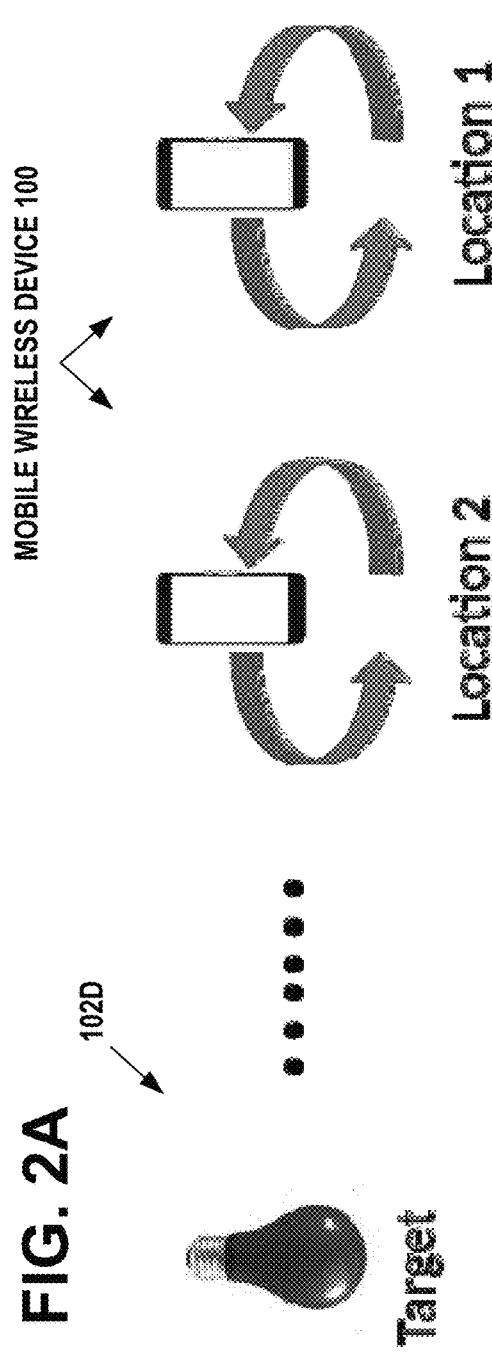
FIG. 2A illustrates how the multi-path effect on RSS measurements may be mitigated by moving the mobile wireless device in a generally circular path while performing the measurements.
Figure 2C:
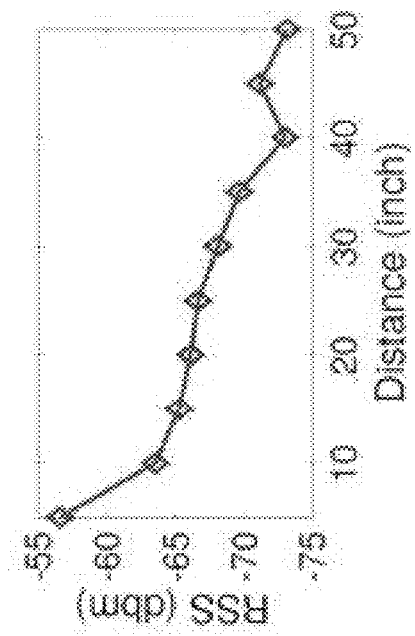
FIG. 2B and FIG. 2C plot measurements of RSS at different distances from a transmitter and average the RSS data at each location.
Figure 2B:
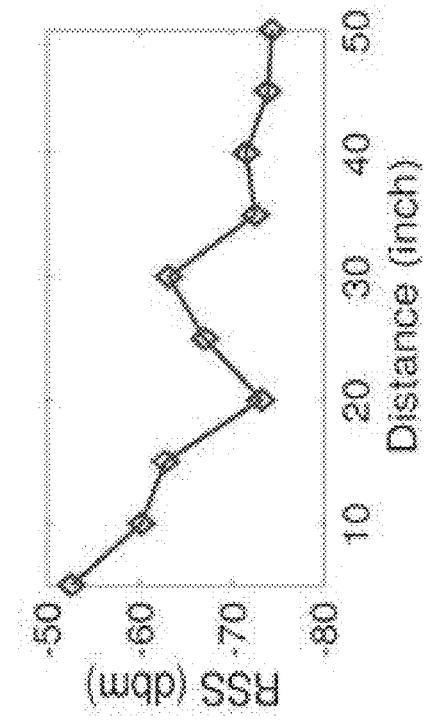

In accordance with example embodiments of the invention, FIG. 2A illustrates how the multi-path effect on RSS measurements may be mitigated by moving the mobile wireless device 100 in a generally circular path while performing the measurements on a target wireless device 102D. FIG. 1B illustrates how multi-path may have both a constructive (multi-path components are in phase) and a destructive (multi-path components are out phase) interference effect on RSS measurements. For the constructive case, a relatively higher RSS value may be measured and for the destructive case, a relatively lower RSS value may be measured. Therefore, instead of fixing the location of the mobile wireless device 100, the mobile wireless device may be moved in a generally circular path (i.e., local movement) when RSS data is collected, as shown in FIG. 2A. By doing this, the RSS measurement may be averaged (spatially) within a small region, and thus the multi-path effect may be mitigated in the measurement. Note that the radius of the generally circular movement should be at least 2.5 inches, which is half of the wavelength (i.e., $\lambda = c/f = (3*^8)/(2.4*^9)$ ≅2.5 inch). Thus, the RSS measurement may be conducted across the full wavelength $\lambda$. To illustrate the effectiveness of local movement of the mobile wireless device 100, FIG. 2B and FIG. 2C plot measurements of RSS at different distances from a transmitter of the target wireless device 102D and average the RSS data at each location. FIG. 2B plots measurements of RSS without local movements. FIG. 2C plots measurements of RSS with local movements. FIG. 2B and FIG. 2C clearly show that local movement of the mobile wireless device 100 results in a smoother and more consistent RSS measurement curve over distance. In accordance with example embodiments of the invention: 1) the movement may be performed in a generally circular path around the measurement location, in an area of roughly 2.5 inch radius; 2) it may include enough random measurement points around the area; and 3) one consistent path may be used across the measurements.

Figure 3A:
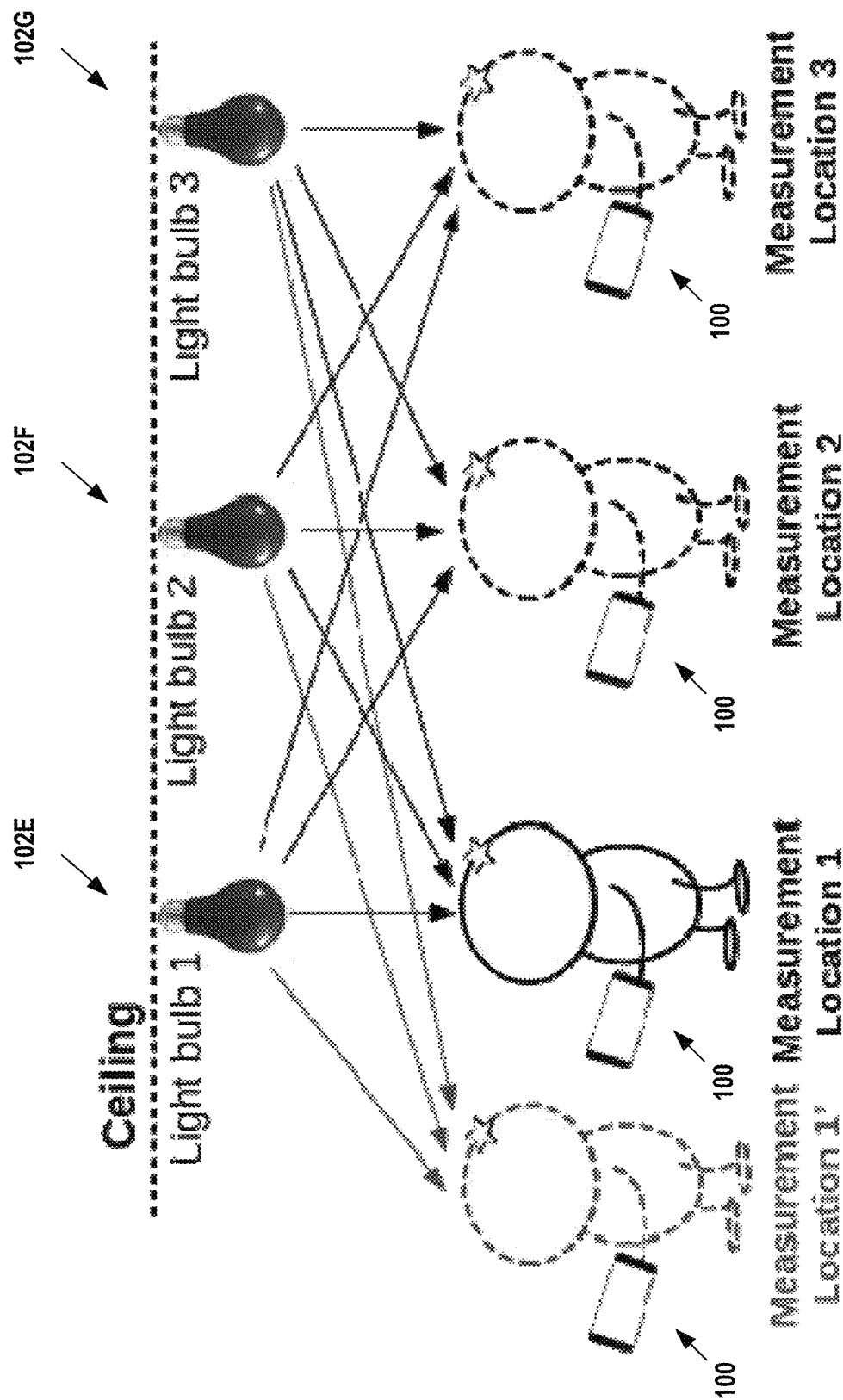
FIG. 3A illustrates an example measuring procedure using motion of the mobile wireless device in a generally circular path to mitigate multi-path effects in measuring the RSS of inaccessible wireless beacon devices.

In accordance with example embodiments of the invention, FIG. 3A illustrates an example measuring procedure using motion of the mobile wireless device in a generally circular path to mitigate multi-path effects in measuring the RSS of inaccessible wireless beacon devices. In this example, IoT wireless device 102E, IoT wireless device 102F, and IoT wireless device 102G are light bulbs located on the ceiling. The objective is to on-board the device IDs of the three light bulbs on the ceiling. To on-board these devices, RSS measurement data is collected from all three light bulbs at fixed-locations, called measurement locations. There are three constraints in selecting a measurement location: First, each measurement location corresponds to a target device, whose device ID is to be found. Therefore, in FIG. 3A, there are three measurement locations for the three target devices. Second, a measurement location of a target device is the position that is closest to that device, compared to the other target devices. Third, a measurement location should be as close as possible to the target device. For example, in FIG. 3A, the measurement location 1 is the closest one (right below) to IoT wireless device 102E for light bulb 1 compared to the left-most measurement location 1'. Hence location 1 should be used even though both locations 1 and 1' satisfy the second constraint. The third constraint avoids the flat-like RSS region illustrated FIG. 1A, and provides enough RSS contrast among multiple target devices.

In accordance with example embodiments of the invention, measurement location of the mobile wireless device is made closer to the target wireless device than the one another target wireless device, when compared to the at least one another target wireless device, in order to increase the accuracy.

For the approachable case where the wireless beacons are accessible, a measurement location may be at the position of the target device, whereas for the unapproachable case, a measurement location may be as close as possible to the target device. For example, as shown in FIG. 3A, the measurement location for IoT wireless device 102E for light bulb 1 on the ceiling (target device), which is unapproachable, is right below the measurement location 1. At each measurement location, the RSS data may be collected from surrounding wireless devices, both target and non-target, for a few seconds. Here, non-target wireless devices are the set of devices that the user is not interested in on-boarding or devices may not be visually present (e.g., devices deployed in other rooms). After collecting the data, a statistical metric (i.e., mean, median, 95 percentile (close to maximum) and 5 percentile (close to minimum)) may be derived for each device or device ID to build an RSS profile. Once the profiles are built for all device IDs, a device identification algorithm may be applied to map the device ID to the measurement location, which physically represents a target device.

Figure 3B:
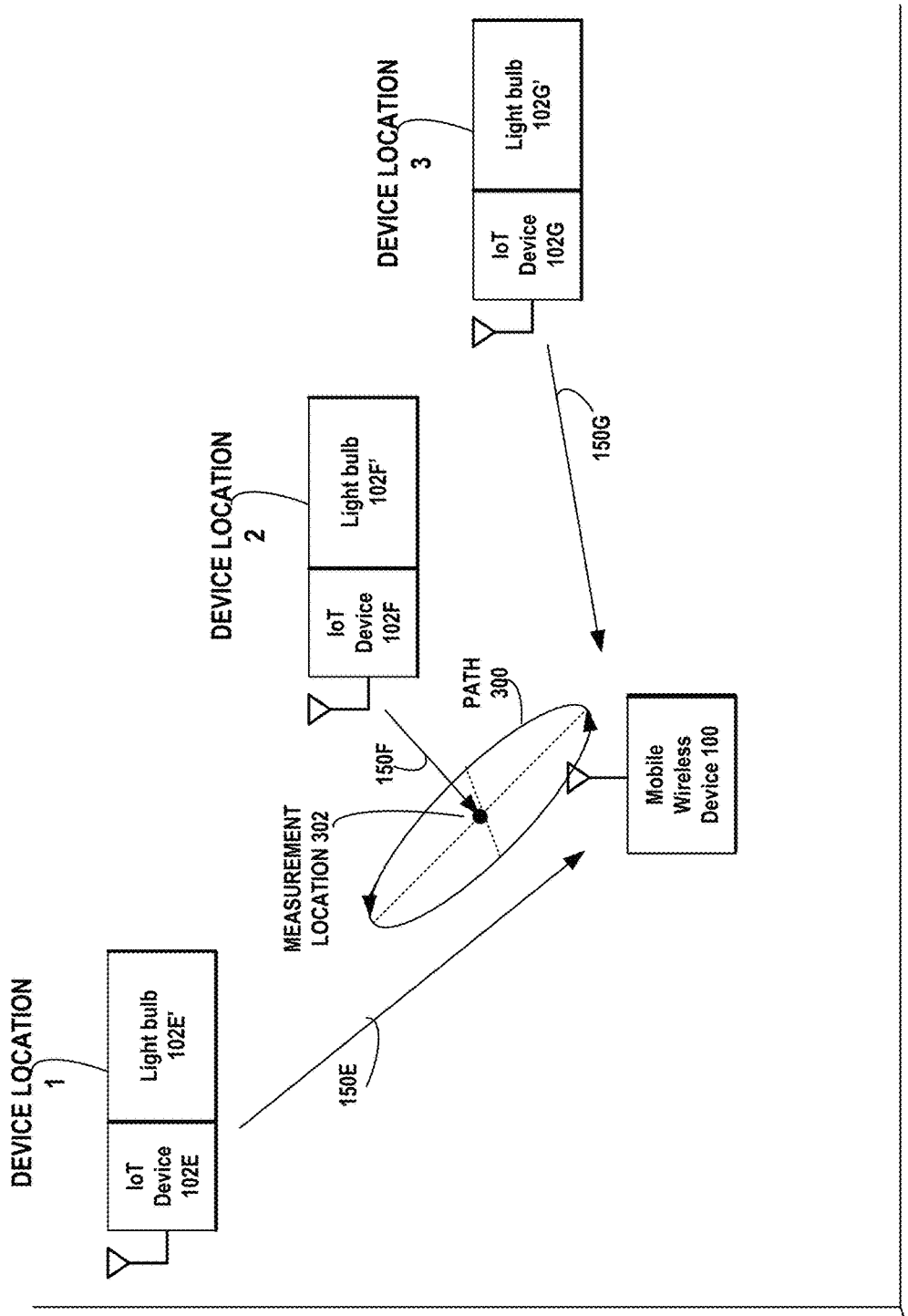
FIG. 3B illustrates an example geometric relationship of the motion of the mobile wireless device in a generally circular path centered on a measurement location that lies along the direction of wireless beacon signals from a target device, while measuring the received signal strength profile of the target device, to obtain an average value of the measured received signal strength.

FIG. 3B illustrates an example geometric relationship of the motion of the mobile wireless device 100 moved by the user in a generally circular path 300 centered on a measurement location 302 that lies along the direction of wireless beacon signals 150F from a target device 102F, while measuring the received signal strength profile of beacon signals 150F from the target device 102F, to obtain an average value of the measured received signal strength. The circular path 300 may lie in a plane substantially perpendicular to the beacon signals 150F from the target device, which is the position that is closer to the selected target device 102F compared to all other adjacent target devices 102E and 102G. The selected target device 102F and other adjacent target devices 102E and 102G are shown in a generalized three dimensional arrangement, for example as suspended light bulbs at various distances from the ceiling. The user may move the mobile wireless device 100 in the generally circular path 300 with minimum radius of 2.5 inch at 2 sec/per circle speed.

Device Identification Algorithms:

Problem Formulation: For better understanding, the problem is formulated before describing the algorithms. Assume, there are N measurement locations for N target devices. For each measurement location, the RSS profile for M number of device IDs includes both the target and the non-target devices (M≥N). Correspondingly, there is an M-by-N matrix D, in which $d_{ij}$ represents the RSS profile of i-th (i=1, 2, . . . M) device ID at j-th (j=1, 2, . . . , N) measurement location.

$$D = \begin{bmatrix} d_{11} & d_{12} & \ldots & d_{1N} \\ d_{21} & d_{22} & \ldots & d_{2N} \\ \ldots & \ldots & \ldots & \ldots \\ d_{M1} & d_{M2} & \ldots & d_{MN} \end{bmatrix} \quad (1)$$

Given the RSS profile matrix D, the objective is to associate the right device ID i for the measurement location j. Before describing the proposed algorithm, two intuitive algorithms are described. Later, in evaluation, these two algorithms are compared with the Voting-based Algorithm in accordance with example embodiments of the invention.

Naive Algorithm. For each measurement location, this algorithm selects the device ID that has the strongest RSS. The outcome of this algorithm may vary due to the different transmission powers of different devices.

Greedy Algorithm. This algorithm improves on Naive Algorithm. It first finds the largest RSS in D, say RSS $d_{ij}$. Then it assigns a measurement location j with device ID i. Afterwards, the row i and column j in D is set to $-\infty$. The procedure repeats N times until N devices at N measurement locations are identified. Compared to Naive Algorithm that considers a measurement location to be independent from other measurement locations, the Greedy algorithm starts with the largest RSS (normally higher confidence) and also avoids assigning same Device ID to multiple measurement locations.

Voting-based Algorithm: In accordance with example embodiments of the invention, a voting-based algorithm considers the likelihood of each device ID at each measurement location. Each device i receives a vote for location j, reflecting its likelihood of being at location j. The vote is calculated as $\Sigma_{k=1}^{N}(d_{ij}-d_{ik})$. This is derived by comparing device is RSS at location j with other locations. A higher vote for device i at location j means that device i has greater signal strength at location j compared to that at other locations. Since each device compares its own signal strength at different locations, the vote is not affected by the difference of transmission powers between devices. Also note that the vote is jointly determined by measurement result from all locations, which makes the result more robust than the result of the greedy algorithm where a single RSS value is used. Consequently, the RSS matrix D is transformed into an M-by-N vote matrix V:

$$V = \begin{bmatrix} \sum_{j=1}^{N}(d_{11}-d_{1j}) & \cdots & \sum_{j=1}^{N}(d_{1N}-d_{1j}) \\ \sum_{j=1}^{N}(d_{21}-d_{2j}) & \cdots & \sum_{j=1}^{N}(d_{2N}-d_{2j}) \\ \cdots & \cdots & \cdots \\ \sum_{j=1}^{N}(d_{M1}-d_{Mj}) & \cdots & \sum_{j=1}^{N}(d_{MN}-d_{Mj}) \end{bmatrix} \quad (2)$$

Based on the vote matrix V, the largest vote summation of N elements in V is searched. These N elements are from unique devices (i.e., different rows) and unique measurement locations (i.e., different columns). A brute-force method may be used, in which every combination of N devices out of M devices is traversed, and for those N devices, every combination of N measurement locations is traversed. The result is given by the combination (device-wise and location-wise) that has the largest summation.

In accordance with example embodiments of the invention, the measurement of the received signal strength of signals transmitted by the target wireless device and by the at least one another target wireless device is a measure of a relative change in received signal strength indicator (RSSI) at different locations. The mobile wireless device processes the measure of the relative change in RSSI with a voting-based algorithm to determine a likelihood that the first device ID of the target wireless device corresponds to the physical location of the first wireless device at the first measurement location. The mobile wireless device provides an output from the voting-based algorithm, of scores for each target device at different locations. The mobile wireless device may send measured received signal strength indicator (RSSI) data to a server to make calculations using a voting-based algorithm In an example embodiment of the invention, the mobile wireless device processes a voting-based algorithm to determine the likelihood that the first device ID of the target wireless device corresponds to the physical location of the first wireless device at the first measurement location. The mobile wireless device device determines that an ith target wireless device and at least the one another target wireless device receive a vote for measurement location j, reflecting likelihood of being at measurement location j and the vote is calculated as $\Sigma_{k=1}^{N}(d_{ij}-d_{ik})$ derived by comparing the ith target wireless device's received signal strength $d_{ij}$ at location j with other measurement locations. The mobile wireless device device determines that a higher vote for the ith target wireless device at measurement location j means that the ith target wireless device has greater received signal strength $d_{ij}$ at measurement location j compared to that at other measurement locations.

Figure 4:
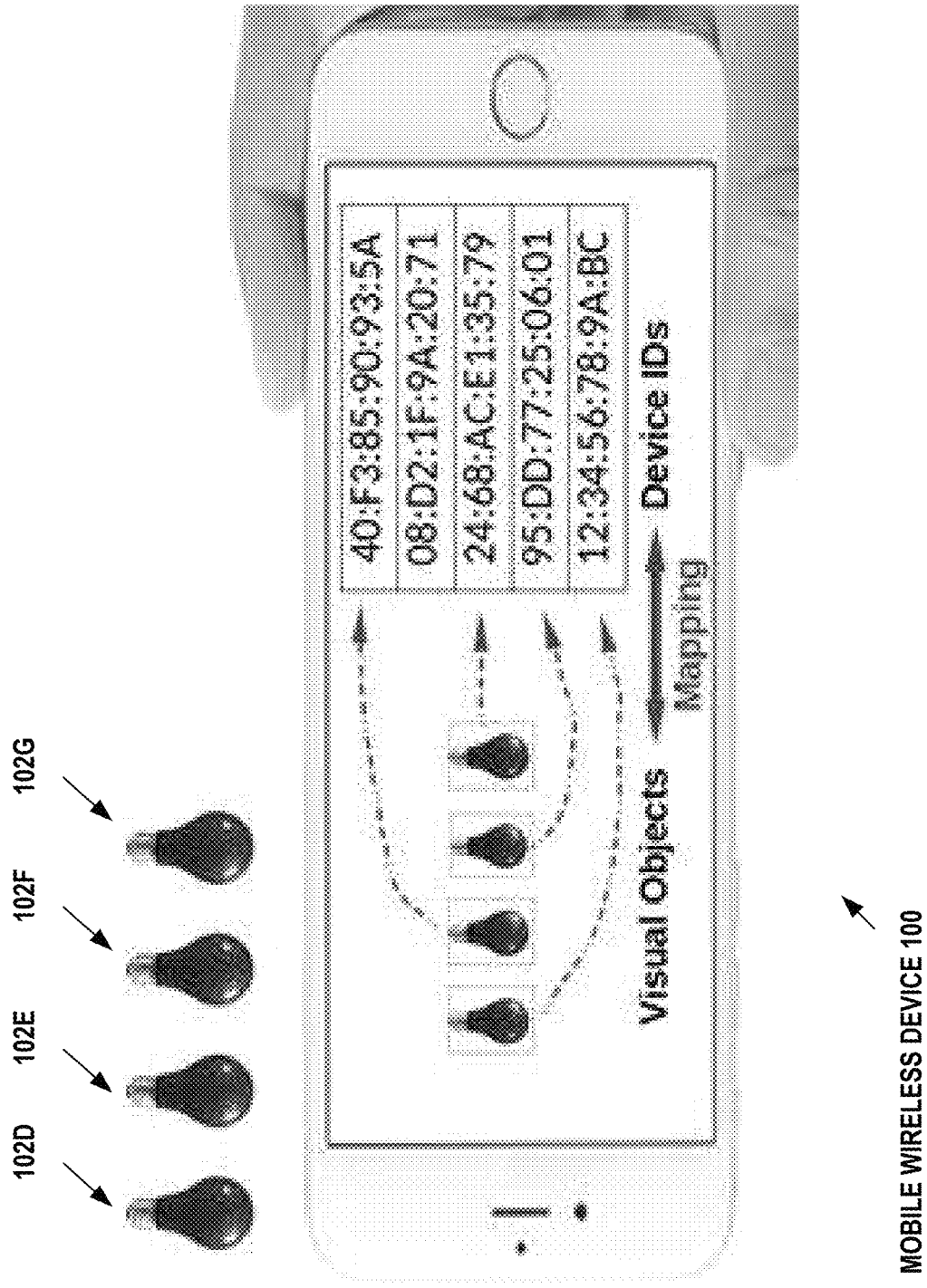
FIG. 4 is an illustration of an example embodiment of the invention associating visual objects with device IDs using a smartphone.

FIG. 4 shows a visual prototype of example embodiments of the invention, where the mobile wireless device 100 is implemented in a smartphone system that associates the visual objects (images or icons) with received device IDs. During the data collection phase, a user clicks a device object on the screen and collects RSS at a position close to the physical location of a wireless beacon device, such as IoT wireless device 102D for the left-most light bulb. The user repeats this procedure for all devices IoT wireless device 102E, IoT wireless device 102F, and IoT wireless device 102G, which are light bulbs located on the ceiling, to on-board. Afterwards, the mobile wireless device 100 automatically binds each visual object with its corresponding device ID. Then the user may control these devices, e.g., setting the brightness level of a light bulb. Note that in general, the system needs to (1) associate the physical device to its device ID, and (2) associate the physical device to its visual representation (e.g. image or icon) in the application. The discussion herein focuses on Step (1). In this simple prototype, Step (2) is done by requiring the user to click on the device image while measuring this wireless beacon device. This may also be done automatically by relying on the smartphone's camera 131 to recognize and track the wireless beacon devices using machine learning, for example.

There are two applications to cover the most general usage scenarios: i) for devices that are at the ceiling and ii) for devices that are at the wall. In both scenarios, it is assumed that the target devices are in line-of-sight (LoS). Note that, the devices that are at the wall are directly accessible and the devices at the ceiling are not.

In accordance with example embodiments of the invention, the following are example steps for the wireless beacon devices that are at the ceiling:

The operator first determines the number of target devices to on-board. The operator may use the mobile device camera 131 to take a single or panoramic image of surrounding target devices in a room. The mobile device may use a computer vision algorithm to recognize matching target devices in the image and create a square box around the recognized devices, as shown in FIG. 4. Thus, the mobile wireless device 100 knows the total number of target wireless devices such as IoT wireless device 102D, IoT wireless device 102E, IoT wireless device 102F, and IoT wireless device 102G, that need to be on-board.

Select the target device from the image for measurement.

After selecting the target device, the mobile device 100 guides or recommends the operator to get to the "right position" (which is right below the selected target device), which is the position that is closer to the selected target device compared to all other adjacent target devices.

In the case that of a depth sensing camera 131 in the mobile device 100, then it may further assist the operator to verify the right position as follows:

Turn on the depth-sensing camera 131 and bring the selected target device in the center of the screen.

The depth sensing camera of the mobile device may estimate the distances between the mobile wireless device 100 and the devices 102D, 102E, 102F, and 102G that are in the camera-view. By comparing the distances, the mobile device 100 may determine if the selected target device is the closest. If not, the mobile device 100 recommends the operator to get closer to the selected target device, until it finds the right position.

Once the user is at the "right position" for the measurement, a button gets enabled to start taking the measurement. At that time the mobile device 100 asks the user to move the phone in a generally circular path with minimum radius of 2.5 inch at 2 sec/per circle speed.

During measurement, the mobile device 100 gets the beacon messages from all surrounding target devices 102D, 102E, 102F, and 102G. Note that each device 102D, 102E, 102F, and 102G broadcasts a beacon message, which carries the device ID (i.e., MAC address). During the measurement, the mobile device 100 extracts the RSSI information and the device IDs information from the broadcasted beacon messages. Note that, during measurement, the mobile device 100 receives 8-15 beacon messages per target device per second.

Once the measured RSSI data have enough variability within one generally circular movement and the average remains stable enough over a couple of generally circular movements (4-6 second period), then the mobile device 100 stops measuring and allows the operator to select next available target device from the image and, for example, indicate in the mobile wireless device to go to the next location, if any, and for example indicate when the distance between the target wireless device and the mobile wireless device is in acceptable level for measurement in the next location.

The process returns to the step for target selection until all target devices are selected for measurement. If all target devices are measured, then the process goes to the following step.

In accordance with example embodiments of the invention, the device identification algorithm (voting based algorithm) is applied to the measurement data collected for the target devices. The algorithm maps device IDs to the corresponding devices.

Finally, the mobile device 100 displays the corresponding device ID of each wireless beacon device 102D, 102E, 102F, and 102G in the image that was captured in the first step.

In accordance with example embodiments of the invention, the following are example steps for the wireless beacon devices that are accessible at the wall:

The operator first determines the number of target device to on-board. The operator may use the mobile device camera 131 to take a single or panoramic image of surrounding target devices 102D, 102E, 102F, and 102G in a room. The mobile device may use a computer vision algorithm to recognize matching target devices in the image and create a square box around the recognized devices, as shown in FIG. 4. Thus, the mobile device 100 knows the total number of target devices that needs to be on-board.

Select the target device from the image for measurement.

After selecting the target device from the image, the mobile device 100 directs the operator to get as close as possible to the selected target device.

The operator clicks a button to start taking the measurement.

During measurement, the mobile device 100 gets the beacon messages from all surrounding target devices 102D, 102E, 102F, and 102G. Note that each device broadcasts a beacon message, which carries the device ID (i.e., MAC address). During the measurement, the mobile device 100 extracts the RSSI information and the device IDs information from the broadcasted beacon messages. Note that, during measurement, the mobile device 100 receives 8-15 beacon message per target device per second.

Once the average of the measured RSSI data remains stable enough over couple of seconds (4-6 second period for example), then the mobile device 100 stops measuring and stores the measuring data and allows the operator to select next available target device from the image.

In one embodiment operator reviews the image and finds next available target device and moves closer to it and when within a couple of feet from it, then the operator may select the target device in the display. The device can then start to collect the RSSI information and the device IDs information from the broadcasted beacon messages in the location.

In one embodiment the mobile wireless device may provide instructions for further action, such as moving the mobile wireless device in a generally circular path for a moment or a repetition of the motion to get enough measurement data.

When the operator is within a couple of feet from the target device, the operator may estimate that she is in the best available location where for the measurement purpose.

The process returns to the step for target selection until all target devices are selected for measurement. If all target devices are measured, then go to next step 8.

In accordance with example embodiments of the invention, the device identification algorithm (voting based algorithm) is applied to the measurement data collected for the target devices in the locations. The algorithm maps device IDs to the corresponding devices.

Finally, the mobile device 100 displays the corresponding device ID of each wireless beacon device 102D, 102E, 102F, and 102G in the image that was captured in the first step.

For evaluation, preliminary experiments were conducted using BLE devices. However, example embodiments of the invention support other wireless communications such as WiFi and Zigbee because it requires RSS measurement information.

Experimental Setup: BLE devices were deployed at three sites: a small meeting room, a medium conference room and an office corridor. Devices are placed at various locations, some not directly approachable, e.g., on ceiling, some approachable, e.g., on table or floor. Different topologies were created on the ceiling including line, grid and random, and also consider the scenario with mixed target and non-target devices. The measurement application was implemented using a smartphone. At each measurement location, RSS data was collected for 30 seconds, and the mean, median, 95 percentile, or 5 percentile value were used.

Accuracy Versus Device Distance:

In this evaluation, the impact was investigated of distance between devices on measurement accuracy when the devices are not approachable (i.e. on the ceiling). Here a pair of devices was used, with distance of either 2 feet or 4 feet in between. The mobile wireless device 100 is placed 6 feet below the measured target device. Thus, the maximum difference of distances between the pair of devices and the mobile wireless device 100 is 0.3 feet (for 2 feet case) and 1.2 feet (for 4 feet case), respectively.

Results of example embodiments of the invention depend on two parameters in the measurement technique:

i) the distance between two adjacent IoT devices (i.e., 'm')

ii) The distance between the target IoT device and the measurement location of the mobile wireless device (i.e., 'd').

In the inventors' evaluation in the indoor environment, in the example the distance was kept fixed between the target IoT device and the measurement location 'd', but by increasing the distance 'm' between two adjacent IoT devices, the accuracy is increased. For instance, when the distance 'd' was kept fixed to 6 feet (which may be the distance in typical indoor environment, when the IoT device is at the ceiling and the measurement location right below that IoT device), for different values of 'm', the following table shows the results:

| m = 2 (feet) | m = 4 (feet) | m = 6 (feet) |
| --- | --- | --- |
| 93.4 (% accuracy) | 97.1 (% accuracy) | 100 (% accuracy) |

Similarly, the inventors have also observed in the example that when keeping 'In' fixed, reducing increases the accuracy. The accuracy is reliable as long as the mobile wireless device, during each measurement, is placed not too far away (say, approximately within 4-6 feet) from the corresponding target IoT devices, and there is enough distance to separate the target IoT device from rest of the IoT devices (say, more than 6 feet).

In the inventors' evaluation, even if the IoT devices are 0.3 feet apart, example embodiments of the invention can achieve 94% accuracy, which is a significant improvement over the current state of the art. As presently understood, the current state of art technique that merely uses absolute RSSI value, which cannot provide such a level of accuracy for such small differences in distance.

Figure 5A:
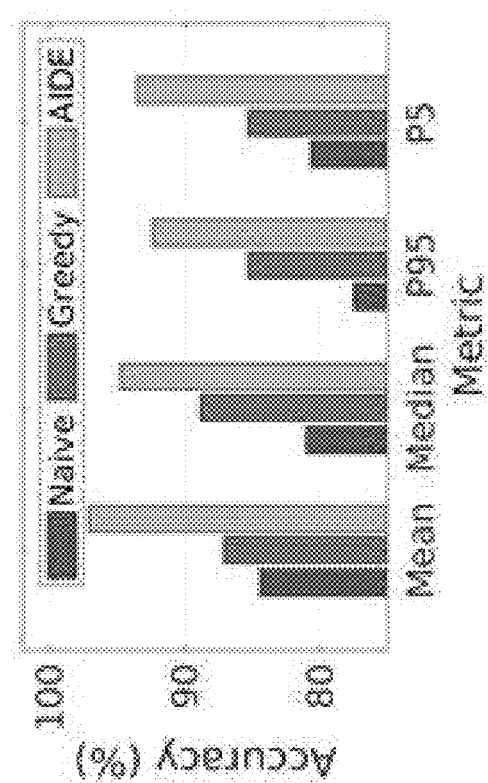
Figure 5B:
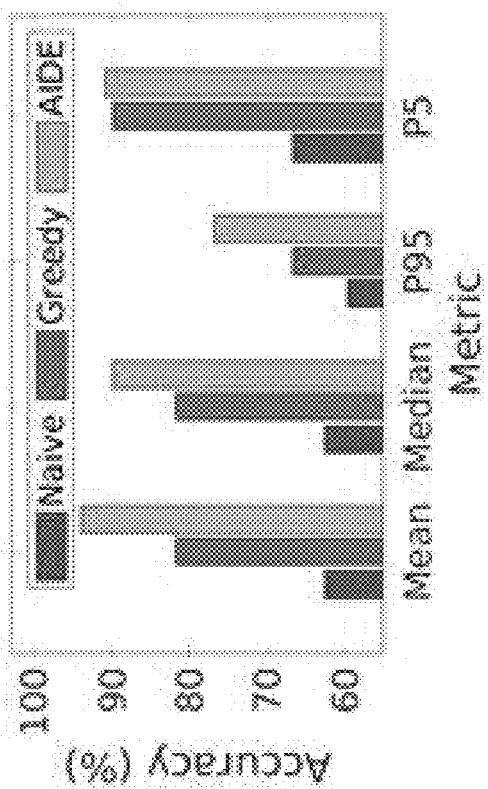

FIGS. 5A and 5B are bar charts illustrating the accuracy of onboarding two target wireless devices on the ceiling, wherein FIG. 5A is for devices two feet apart and FIG. 5B is for devices four feet apart. The figures show the overall accuracy comparison between naive, greedy and voting-based algorithms. It clearly shows that, in accordance with example embodiments of the invention, the voting-based algorithm outperforms the greedy algorithm, which in turn outperforms the naive algorithm. The voting-based algorithm consistently achieves high accuracy using the average or Mean metric, with 93.4% and 97.1% accuracy in 2 feet and 4 feet device distance respectively. Given the fixed distance between the measurement location and the target device, the accuracy increases with the increase of distance between neighboring target devices. In the rest of the evaluation, the average is used in the algorithm, and is compared to the other algorithms with whichever metric (e.g., 5 percentile) gives its highest accuracy.

Devices in Different Topology:

Multiple devices may be deployed in different topologies on the ceiling to form two different topologies to study the accuracy. i) Line Topology: Where 4 devices are deployed in a line at different indoor environments. The distance between neighboring devices is 2 feet and thus the maximum difference of distance between neighboring devices to the mobile wireless device is 0.3 feet. ii) Grid Topology: Where deploy 6 devices are deployed into a 2-by-3 grid on ceiling in the medium conference room. The distance between neighboring devices is 4 feet and thus the maximum difference of distance between neighboring devices to the mobile wireless device is 1.2 feet. Again the mobile wireless device is placed 6 feet below the ceiling.

Table 1 tabulates the accuracy for both topologies. The accuracy of the voting-based algorithm is greater than the greedy algorithm, which in turn is better than the naive algorithm. More specifically, the voting-based algorithm achieves an average 86.2% accuracy for these two topology, with an average improvement of 15.7% and 28.2% compared to the greedy algorithm and the naive algorithm respectively. The accuracy in Table 1 differs from FIG. 5 to separate out multiple devices instead of two.

TABLE 1

Accuracy of onboarding multiple devices that are shaped into a line and a grid

| Algorithm | Topology: Line 2 feet apart on ceiling | Topology: Gird 4 feet apart on ceiling |
| --- | --- | --- |
| Naive | 53.8% (medium) | 62.2% (mean) |
| Greedy | 76.5% (mean) | 64.4% (median) |
| AIDE | 87.9% | 84.4% |

Other Testing Scenarios:

Target and Non-target Devices. Five target devices may be randomly deployed on ceiling at the conference room and 2 non-target devices on ceiling at corridor beside the room, imitating the case where some devices are not visually present. In this setting, the voting-based algorithm achieves 92.0% accuracy of identifying device IDs for the target devices. The percentage that target and non-target devices are falsely categorized as non-target (i.e., false negative) and target devices (i.e., false positive), is 6.0% and 15.0% respectively.

Approachable Scenario: In approachable setting, five devices are deployed at various positions such as on table, floor and TV top in the medium conference room. In this case the voting-based algorithm achieves 100% accuracy. Here the result is as expected, since the measured RSS is very close to the target device, and thus the likelihood is that device at its measurement location is significantly higher than at other measurement locations.

FIG. 6 illustrates an example flow diagram 600 of operational steps in the mobile wireless device 100, in accordance with at least one embodiment of the present invention. The steps of the flow diagram represent computer code instructions stored in the device's RAM and/or ROM memory, which when executed by the device's central processing units, carry out the functions of the example embodiments of the invention. The steps may be carried out in another order than shown and individual steps may be combined or separated into component steps. In some embodiments, one or more steps may be optional. The flow diagram has the following steps:

Step 602: measuring, by a mobile wireless device, a received signal strength of signals transmitted by a target wireless device and by at least one another target wireless device and receiving, by the mobile wireless device, a first device ID associated with signals transmitted by the target wireless device and at least a second device ID associated with signals transmitted by at least the one another target wireless device when the mobile wireless device is located at a first measurement location;

Step 604: determining, by the mobile wireless device, at least in part a comparison of the measured received signal strength of the target wireless device at the first and second measurement locations and a comparison of the measured received signal strength of the one another target wireless device at the first and second measurement locations; and Step 606: determining, by the mobile wireless device, a likelihood that the first device ID of the target wireless device corresponds to a physical location of the first wireless device at the first measurement location, based on comparing the measured received signal strength of the target wireless device at the first and second measurement locations and comparing the measured received signal strength of the one or more other wireless devices at the first and second measurement locations; and Step 608: associating, by the mobile wireless device, the first device ID with the determined target wireless device.

Further example embodiments of the invention may comprise for example:

the mobile wireless device is located at a first measurement location and closest to the target wireless device; and the mobile wireless device is located at a second measurement location and closest to the one another target wireless device.

In example embodiments, in the first measurement location the distance between target wireless device and the mobile wireless device may be substantially shorter than the distance between the mobile wireless device and the one another target wireless device.

In example embodiments, the UI of the mobile wireless device may ping to indicate that at the distance between the mobile wireless device and the target wireless device is in acceptable level for measurement at the location and further indicate when the measurement in the location is in acceptable level to continue to the next location.

Figure 7:
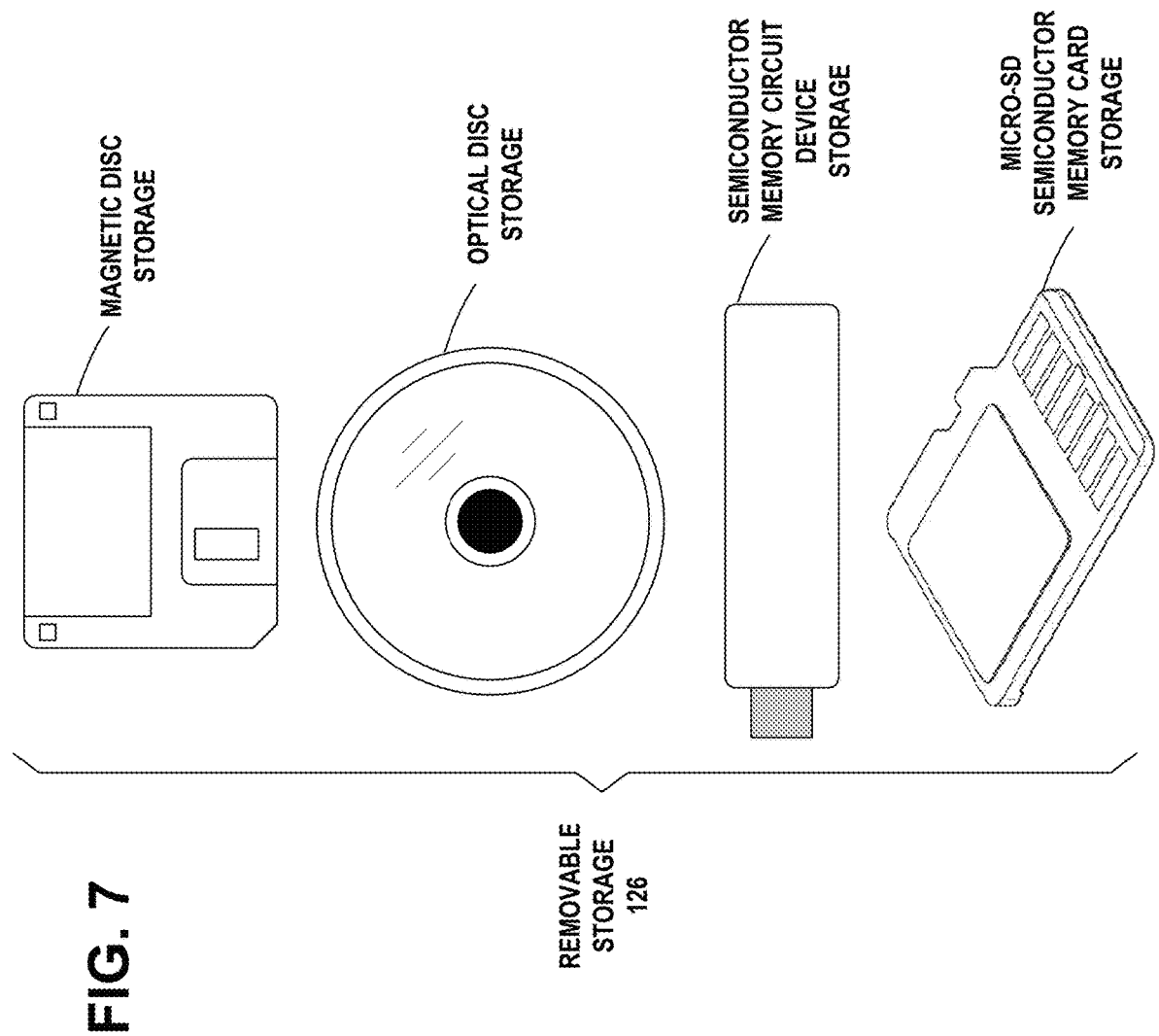
FIG. 7 illustrates an example embodiment of the invention, wherein examples of removable storage media are shown, in accordance with an example embodiment of the invention.

FIG. 7 illustrates an example embodiment of the invention, wherein examples of removable storage media 124/126 are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with an example embodiment of the invention.

Various further embodiments of the invention may comprise at least one feature drawn from the following bulleted list:

Received signal strength indicator (RSSI) may not always be reliable due to multi-path effects. However, the example embodiments of the invention mitigate such effects. In example embodiments of the invention, instead of using the absolute RSSI value, the relative change in RSSI is used at different locations, to formulate a voting matrix, which provides scores for the target devices at different locations.

In example embodiments of the invention, an algorithm may be used that maps each device ID (extracted from the beacon message) with the corresponding device (identified by its measurement location).

In example embodiments of the invention, during interaction between the user and the mobile wireless device, the user knows to go to the next location from the already measured location, for example, by indicating as the output to the user that measurement data is received in the measured location.

In example embodiments of the invention, the measured RSSI data have enough variability within one of the generally circular movement paths and an average value over the generally circular movement path remains stable within a predefined threshold, indicating that the mobile device can stop measuring or continue to the next location.

In example embodiments of the invention, a 3D scenario may be used to measure each target device from a location as close to the device as possible. In the 3D scenario, first identify objects that are directly reachable, for example, those on floor and wall, because in this case example embodiments of the invention result in 100 percent accuracy. After separating out those devices that are easier to identify, then measure the devices that are not directly approachable, e.g., those on ceiling.

In example embodiments of the invention, a user interface (UI) screen shows a still image that has one or more of the target devices and their positions. The user clicks on each target device and performs the corresponding measurement in the corresponding location. After the measurement has been done for all target devices, an algorithm is invoked to produce a mapping.

In example embodiments of the invention, a still image that contains all the target devices may be taken before the measurement. Image processing is used to recognize and locate the devices in the image. During the measurement, when the operator gets physically close to a target device, she can visually identify the corresponding device in the image, and then click on the device in the image and collect the measurement data. This may also be done automatically with a smartphone camera and advanced machine learning based a computer vision technique, to detect and track each object during the measurement.

In example embodiments of the invention, the measurement location of the mobile wireless device is made close to the target device, when compared to other target devices, in order to increase the accuracy.

In example embodiments of the invention, keeping the distance between the target device and the measurement location of the mobile wireless device substantially in same distance, a generally circular movement may be made around that measurement location (which is, for example, couple of inches away from the measurement location). The purpose of the generally circular motion is to add some small perturbation to the measurement location in order to reduce multi-path effects. In the inventors' experiment, the rate of the generally circular movement was 1-2/sec per circle, however, different rates of motion may be used. Circling multiple times may improve the accuracy of the results.

In example embodiments of the invention, the mobile wireless device may send the signal data to a server to make the calculations.

Although specific example embodiments have been disclosed, a person skilled in the art will understand that changes can be made to the specific example embodiments without departing from the spirit and scope of the invention.

What is claimed is:

1. An apparatus, comprising:
   at least one processor;
   at least one memory including computer program code;
   the at least one memory and the computer program code configured to, with the at least one processor, cause the apparatus at least to:
   measure, by a mobile wireless device, a received signal strength of signals transmitted by a target wireless device and by at least one another target wireless device and receiving, by the mobile wireless device, a first device ID associated with signals transmitted by the target wireless device and at least a second device ID associated with signals transmitted by at least the one another target wireless device when the mobile wireless device is located at a first measurement location and is moving in a substantially circular movement path substantially centered on the first measurement location so that an average value of repeated measurements of the received signal strength over the substantially circular movement path mitigates multi-path effects in the measurement;
   measure, by the mobile wireless device, a received signal strength of signals transmitted by at least the one another target wireless device and by the target wireless device and receiving, by the mobile wireless device, the first device ID associated with signals transmitted by the target wireless device and the second device ID associated with signals transmitted by the one another target wireless device when the mobile wireless device is located at a second measurement location and is moving in the substantially circular movement path substantially centered on the second measurement location so that the average value of repeated measurements of the received signal strength over the substantially circular movement path mitigates multi-path effects in the measurement;
   determine, by the mobile wireless device, at least in part a comparison of the measured received signal strength of the target wireless device at the first and second measurement locations and a comparison of the measured received signal strength of the one another target wireless device at the first and second measurement locations; and
   associate, by the mobile wireless device, the first device ID with the determined target wireless device.

2. The apparatus of claim 1, further comprising:
   the at least one memory and the computer program code configured to, with the at least one processor, cause the apparatus at least to:
   display, by the mobile wireless device, on a user interface, a first object image of the target wireless device and a second object image of at least the one another target wireless device;
   receive, by the mobile wireless device, via the user interface, a user selection of the first object image when the mobile wireless device is located at the first measurement location near the target wireless device, and receiving, by the mobile wireless device, via the user interface, a user selection of the second object image when the mobile wireless device is located at the second measurement location near at least the one another target wireless device;
   bind, by the mobile wireless device, the first object image with the first device ID associated with the signals transmitted by the target wireless device, in response to the determined likelihood that the first device ID of the target wireless device corresponds to a physical location of the first wireless device at the first measurement location.

3. The apparatus of claim 2, further comprising:
   the at least one memory and the computer program code configured to, with the at least one processor, cause the apparatus at least to:
   capture, by the mobile wireless device, with a digital camera associated with the mobile wireless device, the first object image of the target wireless device and the second object image of at least the one another target wireless devices.

4. The apparatus of claim 1, further comprising:
   the at least one memory and the computer program code configured to, with the at least one processor, cause the apparatus at least to:
   move, by the mobile wireless device, over the substantially circular path when the mobile wireless device is located at the first measurement location near the target wireless device, and making a plurality of measurements of the received signal strength of the target wireless device while the mobile wireless device is at the first measurement location, to obtain the average value of the measured received signal strength.

5. The apparatus of claim 1, further comprising:
   the at least one memory and the computer program code configured to, with the at least one processor, cause the apparatus at least to:
   process, by the mobile wireless device, a voting-based algorithm to determine a likelihood that the first device ID of the target wireless device corresponds to the physical location of the first wireless device at the first measurement location;
   wherein, the mobile wireless device device determines that an ith target wireless device and at least the one another target wireless device receive a vote for measurement location j, reflecting likelihood of being at measurement location j and the vote is calculated as $\Sigma_{k=1}^{N}(d_{ij}-d_{ik})$ derived by comparing the ith target wireless device's received signal strength $d_{ij}$ at location j with other measurement locations; and
   wherein, the mobile wireless device device determines that a higher vote for the ith target wireless device at measurement location j means that the ith target wireless device has greater received signal strength $d_{ij}$ at measurement location j compared to that at other measurement locations.

6. The apparatus of claim 1, wherein the measurement of the received signal strength of signals transmitted by the target wireless device and by the at least one another target wireless device is a measure of a relative change in received signal strength indicator (RSSI) at the different measurement locations;
   the at least one memory and the computer program code configured to, with the at least one processor, cause the apparatus at least to:
   process, by the mobile wireless device, the measure of the relative change in RSSI with a voting-based algorithm to determine a likelihood that the first device ID of the target wireless device corresponds to the location of the first wireless device at the first measurement location; and
   provide, by the mobile wireless device, an output from the voting-based algorithm, of scores for the target wireless device at the different measurement locations.

7. The apparatus of claim 1, wherein the mobile wireless device includes an algorithm that maps at least the first and second device ID extracted from the signals received from at least the target wireless device and from the at least one another target wireless device with the target wireless device and the at least one another target wireless device relating to the corresponding first and second measurement locations.

8. The apparatus of claim 1, wherein indicating by the mobile wireless device to go to the second measurement location from the first measurement location.

9. The apparatus of claim 1, wherein measured received signal strength indicator (RSSI) data reaches a predefined level of variability within at least one of the substantially circular movement path of the mobile wireless device so that the average value of the measured RSSI over the substantially circular movement path remains stable within a predefined threshold during at least the first measurement, indicating the mobile wireless device of stopping at least the first measurement.

10. The apparatus of claim 1, wherein a user interface (UI) screen associated with the mobile wireless device, is configured to show a still image that depicts the target wireless device and the at least one another target wireless device and their positions, enabling the user to click on the target wireless device and the at least one another target wireless device perform the corresponding at least first and second measurements, and an algorithm in the mobile wireless device configured to map the first device ID of the first target wireless device and the second ID of the at least the one another target wireless devices extracted from the signals received from the target wireless device and the at least one another target wireless device at least in the first and second measurement locations, respectively with the target wireless device and the at least one another target wireless device.

11. The apparatus of claim 1, wherein a digital camera associated with the mobile wireless device, configured to capture a still image taken before the measurement, containing images of the target wireless device and the at least one another target wireless device, and an image processing algorithm configured to
- recognize and locate the target wireless device and the at least one another target wireless devices in the still image, enable the user, during the measurement, when physically close to the target wireless device in the corresponding first measurement location or second measurement location, visually identify the corresponding target wireless device or the at least one another target wireless device in the still image, then click on the corresponding target wireless device or the at least one another target wireless device in the still image, and collect the measurement.

12. The apparatus of claim 1, wherein the first measurement location of the mobile wireless device is configured to be closer to the target wireless device than the one another target wireless device.

13. The apparatus of claim 1, wherein motion of the mobile wireless device moved by the user is in the substantially circular path centered on a measurement location that lies along a direction of wireless beacon signals from a target device, while measuring received signal strength of the beacon signals from the target device, to obtain the average value of the measured received signal strength.

14. The apparatus of claim 1, wherein the mobile wireless device sends measured received signal strength indicator (RSSI) data to a server to make calculations using a voting-based algorithm.

15. A method, comprising:
measuring, by a mobile wireless device, a received signal strength of signals transmitted by a target wireless device and by at least one another target wireless device and receiving, by the mobile wireless device, a first device ID associated with signals transmitted by the target wireless device and at least a second device ID associated with signals transmitted by at least the one another target wireless device when the mobile wireless device is located at a first measurement location and is moving in a substantially circular movement path substantially centered on the first measurement location so that an average value of repeated measurements of the received signal strength over the substantially circular movement path mitigates multi-path effects in the measurement;

measuring, by the mobile wireless device, a received signal strength of signals transmitted by at least the one another target wireless device and by the target wireless device and receiving, by the mobile wireless device, the first device ID associated with signals transmitted by the target wireless device and the second device ID associated with signals transmitted by the one another target wireless device when the mobile wireless device is located at a second measurement location and is moving in the substantially circular movement path substantially centered on the second measurement location so that the average value of repeated measurements of the received signal strength over the substantially circular movement path mitigates multi-path effects in the measurement;

determining, by the mobile wireless device, at least in part a comparison of the measured received signal strength of the target wireless device at the first and second measurement locations and a comparison of the measured received signal strength of the one another target wireless device at the first and second measurement locations; and associating, by the mobile wireless device, the first device ID with the determined target wireless device.

16. The method of claim 15 further comprising:
displaying, by the mobile wireless device, on a user interface, a first object image of the target wireless device and a second object image of at least the one another target wireless device;

receiving, by the mobile wireless device, via the user interface, a user selection of the first object image when the mobile wireless device is located at the first measurement location near the target wireless device, and receiving, by the mobile wireless device, via the user interface, a user selection of the second object image when the mobile wireless device is located at the second measurement location near at least the one another target wireless device;

binding, by the mobile wireless device, the first object image with the first device ID associated with the signals transmitted by the target wireless device, in response to the determined likelihood that the first device ID of the target wireless device corresponds to a physical location of the first wireless device at the first measurement location.

17. The method of claim 15, further comprising:
moving, by the mobile wireless device, over the substantially circular path when the mobile wireless device is located at the first measurement location near the target wireless device, and making a plurality of measurements of the received signal strength of the target wireless device while the mobile wireless device is at the first measurement location, to obtain the average value of the measured received signal strength.

18. A computer program product comprising computer executable program code recorded on a computer readable non-transitory storage medium, the computer executable program code comprising:
- code for measuring, by a mobile wireless device, a received signal strength of signals transmitted by a target wireless device and by at least one another target wireless device and receiving, by the mobile wireless device, a first device ID associated with signals transmitted by the target wireless device and at least a second device ID associated with signals transmitted by at least the one another target wireless device when the mobile wireless device is located at a first measurement location and is moving in a substantially circular movement path substantially centered on the first measurement location so that an average value of repeated measurements of the received signal strength over the substantially circular movement path mitigates multi-path effects in the measurement;
- code for measuring, by the mobile wireless device, a received signal strength of signals transmitted by at least the one another target wireless device and by the target wireless device and receiving, by the mobile wireless device, the first device ID associated with signals transmitted by the target wireless device and the second device ID associated with signals transmitted by the one another target wireless device when the mobile wireless device is located at a second measurement location and is moving in the substantially circular movement path substantially centered on the second measurement location so that the average value of repeated measurements of the received signal strength over the substantially circular movement path mitigates multi-path effects in the measurement;
- code for determining, by the mobile wireless device, at least in part a comparison of the measured received signal strength of the target wireless device at the first and second measurement locations and a comparison of the measured received signal strength of the one another target wireless device at the first and second measurement locations; and
- code for associating, by the mobile wireless device, the first device ID with the determined target wireless device.

* * * * *